US008671234B2

(12) United States Patent
Kobayashi

(10) Patent No.: US 8,671,234 B2
(45) Date of Patent: Mar. 11, 2014

(54) LEVEL SHIFTING CABLE ADAPTOR AND CHIP SYSTEM FOR USE WITH DUAL-MODE MULTI-MEDIA DEVICE

(75) Inventor: Osamu Kobayashi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 840 days.

(21) Appl. No.: 12/888,062

(22) Filed: Sep. 22, 2010

(65) Prior Publication Data

US 2011/0293035 A1    Dec. 1, 2011

Related U.S. Application Data

(60) Provisional application No. 61/348,878, filed on May 27, 2010.

(51) Int. Cl.
*G06F 13/38* (2006.01)

(52) U.S. Cl.
USPC .............................................. 710/62; 710/72

(58) Field of Classification Search
None
See application file for complete search history.

(56) References Cited

U.S. PATENT DOCUMENTS

| | | | |
|---|---|---|---|
| 4,479,142 A | 10/1984 | Buschman et al. |
| 4,796,203 A | 1/1989 | Roberts |
| 4,868,557 A | 9/1989 | Perlman |
| 5,007,050 A | 4/1991 | Kasparian et al. |
| 5,245,612 A | 9/1993 | Kachi et al. |
| 5,258,983 A | 11/1993 | Lane et al. |
| 5,369,775 A | 11/1994 | Yamasaki et al. |
| 5,425,101 A | 6/1995 | Woo et al. |
| 5,515,296 A | 5/1996 | Agarwal |
| 5,541,919 A | 7/1996 | Yong et al. |
| 5,608,418 A | 3/1997 | McNally |
| 5,615,376 A | 3/1997 | Ranganathan |
| 5,625,379 A | 4/1997 | Reinert et al. |
| 5,629,715 A | 5/1997 | Zenda |
| 5,670,973 A | 9/1997 | Bassetti, Jr. et al. |
| 5,739,803 A | 4/1998 | Neugebauer |
| 5,745,837 A | 4/1998 | Fuhrmann |
| 5,790,083 A | 8/1998 | Bassetti |
| 5,801,776 A | 9/1998 | Tamura et al. |
| 5,805,173 A | 9/1998 | Glennon et al. |
| 5,835,498 A | 11/1998 | Kim et al. |

(Continued)

FOREIGN PATENT DOCUMENTS

| | | |
|---|---|---|
| CN | 1353513 | 6/2002 |
| EP | 0 354 480 A | 2/1990 |

(Continued)

OTHER PUBLICATIONS

Notice of Allowance dated Dec. 5, 2011 from U.S. Appl. No. 12/767,429.

(Continued)

*Primary Examiner* — Cheng-Yuan Tseng
(74) *Attorney, Agent, or Firm* — Beyer Law Group LLP

(57) ABSTRACT

Methods and systems are described for enabling improved interface between a dual-mode multimedia source that supports a pair of data formats and a sink device operable using inputs in a third data format. An adaptor device enabling improved connectivity as well as backward compatibility with legacy devices is disclosed. The system enables the transmission of sideband channel configured in an I²C over AUX format thereby enabling increased performance in sideband channels of a dual-mode source.

34 Claims, 6 Drawing Sheets

(56) References Cited

U.S. PATENT DOCUMENTS

| | | |
|---|---|---|
| 5,835,730 A | 11/1998 | Grossman et al. |
| 5,838,875 A | 11/1998 | Cho et al. |
| 5,852,630 A | 12/1998 | Langberg et al. |
| 5,887,039 A | 3/1999 | Suemura et al. |
| 5,909,465 A | 6/1999 | Bottomley et al. |
| 5,918,002 A | 6/1999 | Klemets et al. |
| 5,926,155 A | 7/1999 | Arai et al. |
| 5,940,070 A | 8/1999 | Koo |
| 5,940,137 A | 8/1999 | Hulvey |
| 5,949,437 A | 9/1999 | Clark |
| 6,005,613 A | 12/1999 | Endsley et al. |
| 6,005,861 A | 12/1999 | Humpleman |
| 6,020,901 A | 2/2000 | Lavelle et al. |
| 6,026,179 A | 2/2000 | Brett |
| 6,038,000 A | 3/2000 | Hurst, Jr. |
| 6,049,316 A | 4/2000 | Nolan et al. |
| 6,049,769 A | 4/2000 | Holmes et al. |
| 6,069,929 A | 5/2000 | Yabe et al. |
| 6,151,334 A | 11/2000 | Kim et al. |
| 6,151,632 A | 11/2000 | Chadda et al. |
| 6,154,225 A | 11/2000 | Kou et al. |
| 6,172,988 B1 | 1/2001 | Tiernan et al. |
| 6,175,573 B1 | 1/2001 | Togo et al. |
| 6,177,922 B1 | 1/2001 | Schiefer et al. |
| 6,219,736 B1 | 4/2001 | Klingman |
| 6,223,089 B1 | 4/2001 | Page |
| 6,249,319 B1 | 6/2001 | Post |
| 6,326,961 B1 | 12/2001 | Lin et al. |
| 6,330,605 B1 | 12/2001 | Christensen et al. |
| 6,337,964 B2 | 1/2002 | Inami et al. |
| 6,353,594 B1 | 3/2002 | Tooker et al. |
| 6,356,260 B1 | 3/2002 | Montalbo |
| 6,437,768 B1 | 8/2002 | Kubota et al. |
| 6,441,857 B1 | 8/2002 | Wicker et al. |
| 6,446,130 B1 | 9/2002 | Grapes |
| 6,477,252 B1 | 11/2002 | Faber et al. |
| 6,490,705 B1 | 12/2002 | Boyce |
| 6,542,967 B1 | 4/2003 | Major |
| 6,543,053 B1 | 4/2003 | Li et al. |
| 6,545,688 B1 | 4/2003 | Loveridge et al. |
| 6,577,303 B2 | 6/2003 | Kim |
| 6,585,431 B1 | 7/2003 | Okamoto |
| 6,587,480 B1 | 7/2003 | Higgins et al. |
| 6,598,161 B1 | 7/2003 | Kluttz et al. |
| 6,600,469 B1 | 7/2003 | Nukiyama et al. |
| 6,608,828 B1 | 8/2003 | Balachandran |
| 6,614,800 B1 | 9/2003 | Genty et al. |
| 6,661,422 B1 | 12/2003 | Valmiki et al. |
| 6,693,895 B1 | 2/2004 | Crummey et al. |
| 6,697,376 B1 | 2/2004 | Son et al. |
| 6,704,310 B1 | 3/2004 | Zimmermann et al. |
| 6,765,931 B1 | 7/2004 | Rabenko et al. |
| 6,778,168 B2 | 8/2004 | Mamiya et al. |
| 6,801,711 B1 | 10/2004 | Kim et al. |
| 6,862,606 B1 | 3/2005 | Major et al. |
| 6,865,188 B1 | 3/2005 | Stirling et al. |
| 6,873,625 B1 | 3/2005 | Yoo et al. |
| 6,874,118 B1 | 3/2005 | Pirzadeh et al. |
| 6,903,716 B2 | 6/2005 | Kawabe et al. |
| 6,907,067 B1 | 6/2005 | Moeller et al. |
| 6,909,442 B2 | 6/2005 | Hiyama et al. |
| 6,914,637 B1 | 7/2005 | Wolf et al. |
| 6,963,968 B2 | 11/2005 | Kori |
| 6,973,069 B1 | 12/2005 | Spear et al. |
| 6,975,645 B1 | 12/2005 | Suzuki et al. |
| 7,006,506 B1 | 2/2006 | Naik |
| 7,046,631 B1 | 5/2006 | Giroux et al. |
| 7,068,686 B2 | 6/2006 | Kobayashi |
| 7,075,987 B2 | 7/2006 | Kim et al. |
| 7,088,741 B2 | 8/2006 | Kobayashi |
| 7,099,277 B2 | 8/2006 | Sahinoglu et al. |
| 7,136,415 B2 | 11/2006 | Yun et al. |
| 7,177,329 B2 | 2/2007 | Kobayashi et al. |
| 7,194,554 B2 | 3/2007 | Short et al. |
| 7,248,590 B1 | 7/2007 | Liu |
| 7,256,790 B2 | 8/2007 | Valmiki et al. |
| 7,295,578 B1 | 11/2007 | Lyle et al. |
| 7,348,957 B2 | 3/2008 | Cui et al. |
| 7,453,479 B2 | 11/2008 | Le et al. |
| 7,487,273 B2 | 2/2009 | Kobayashi |
| 7,525,975 B2 | 4/2009 | Caspi et al. |
| 7,620,062 B2 | 11/2009 | Kobayashi |
| 7,766,692 B2 * | 8/2010 | Johnsen et al. ............... 439/488 |
| 8,019,905 B2 * | 9/2011 | Wu et al. ..................... 710/14 |
| 8,242,803 B2 * | 8/2012 | Wu et al. ..................... 326/30 |
| 2001/0014936 A1 | 8/2001 | Jinzaki |
| 2001/0019560 A1 | 9/2001 | Yamashita |
| 2001/0030649 A1 | 10/2001 | Mamiya et al. |
| 2001/0036193 A1 | 11/2001 | Kori |
| 2001/0038387 A1 | 11/2001 | Tomooka et al. |
| 2001/0052011 A1 | 12/2001 | Nagao |
| 2002/0007452 A1 | 1/2002 | Traw et al. |
| 2002/0011996 A1 | 1/2002 | Inoue et al. |
| 2002/0033981 A1 | 3/2002 | Keller et al. |
| 2002/0036631 A1 | 3/2002 | Perez |
| 2002/0054420 A1 | 5/2002 | Fergusson |
| 2002/0060676 A1 | 5/2002 | Kim |
| 2002/0061024 A1 | 5/2002 | Malkemes et al. |
| 2002/0062394 A1 | 5/2002 | Bunn et al. |
| 2002/0071055 A1 | 6/2002 | Ooshima et al. |
| 2002/0071390 A1 | 6/2002 | Reeves et al. |
| 2002/0075250 A1 | 6/2002 | Shigeta et al. |
| 2002/0075902 A1 | 6/2002 | Abbas et al. |
| 2002/0080468 A1 | 6/2002 | Crummey et al. |
| 2002/0085582 A1 | 7/2002 | Kim |
| 2002/0089517 A1 | 7/2002 | Ludtke et al. |
| 2002/0122515 A1 | 9/2002 | Bodenschatz |
| 2002/0136219 A1 | 9/2002 | Ding et al. |
| 2002/0149617 A1 | 10/2002 | Becker |
| 2002/0163598 A1 | 11/2002 | Pasqualino |
| 2002/0164022 A1 | 11/2002 | Strasser et al. |
| 2002/0184327 A1 | 12/2002 | Major et al. |
| 2002/0190974 A1 | 12/2002 | Morita |
| 2002/0190978 A1 | 12/2002 | Agarwal et al. |
| 2002/0191625 A1 | 12/2002 | Kelly et al. |
| 2003/0035442 A1 | 2/2003 | Eng |
| 2003/0048852 A1 | 3/2003 | Hwang et al. |
| 2003/0056051 A1 | 3/2003 | Burke et al. |
| 2003/0063077 A1 | 4/2003 | Koyama |
| 2003/0067552 A1 | 4/2003 | Leyvi et al. |
| 2003/0067558 A1 | 4/2003 | Shintani et al. |
| 2003/0076282 A1 | 4/2003 | Ikeda et al. |
| 2003/0080971 A1 | 5/2003 | Hochmuth et al. |
| 2003/0112822 A1 | 6/2003 | Hong et al. |
| 2003/0138102 A1 | 7/2003 | Kohn et al. |
| 2003/0145258 A1 | 7/2003 | Warner et al. |
| 2003/0149987 A1 | 8/2003 | Pasqualino et al. |
| 2003/0152160 A1 | 8/2003 | Bauch et al. |
| 2003/0174022 A1 | 9/2003 | Zamir et al. |
| 2003/0174156 A1 | 9/2003 | Katsuhara et al. |
| 2003/0174795 A1 | 9/2003 | Bruhnke et al. |
| 2003/0177423 A1 | 9/2003 | Komatsu et al. |
| 2003/0212811 A1 | 11/2003 | Thornton |
| 2003/0220026 A1 | 11/2003 | Oki et al. |
| 2004/0022204 A1 | 2/2004 | Trembley |
| 2004/0049705 A1 | 3/2004 | Liebenow |
| 2004/0059852 A1 | 3/2004 | Sun et al. |
| 2004/0068744 A1 | 4/2004 | Claussen et al. |
| 2004/0080523 A1 | 4/2004 | Myers |
| 2004/0080671 A1 | 4/2004 | Siemens et al. |
| 2004/0081151 A1 | 4/2004 | Greis et al. |
| 2004/0088469 A1 | 5/2004 | Levy |
| 2004/0100583 A1 | 5/2004 | Yoneno |
| 2004/0103333 A1 | 5/2004 | Martwick et al. |
| 2004/0114607 A1 | 6/2004 | Shay et al. |
| 2004/0150928 A1 | 8/2004 | Goodfellow et al. |
| 2004/0179593 A1 | 9/2004 | Goldstein et al. |
| 2004/0198386 A1 | 10/2004 | Dupray |
| 2004/0199565 A1 | 10/2004 | Visharam et al. |
| 2004/0203383 A1 | 10/2004 | Kelton et al. |
| 2004/0207625 A1 | 10/2004 | Griffin et al. |
| 2004/0210805 A1 | 10/2004 | Kimelman et al. |
| 2004/0218598 A1 | 11/2004 | Kobayashi |
| 2004/0218599 A1 | 11/2004 | Kobayashi |

(56) References Cited

U.S. PATENT DOCUMENTS

| | | |
|---|---|---|
| 2004/0218624 A1 | 11/2004 | Kobayashi |
| 2004/0218625 A1 | 11/2004 | Kobayashi |
| 2004/0218627 A1 | 11/2004 | Kobayashi |
| 2004/0221056 A1 | 11/2004 | Kobayashi |
| 2004/0221180 A1 | 11/2004 | Enami et al. |
| 2004/0221312 A1 | 11/2004 | Kobayashi |
| 2004/0221315 A1 | 11/2004 | Kobayashi |
| 2004/0228365 A1 | 11/2004 | Kobayashi |
| 2004/0233181 A1 | 11/2004 | Kobayashi |
| 2004/0240454 A1 | 12/2004 | Yamauchi et al. |
| 2004/0243905 A1 | 12/2004 | Merritt |
| 2005/0062699 A1 | 3/2005 | Kobayashi |
| 2005/0062711 A1 | 3/2005 | Kobayashi |
| 2005/0066085 A1 | 3/2005 | Kobayashi |
| 2005/0103333 A1 | 5/2005 | Bonutti |
| 2005/0157714 A1 | 7/2005 | Shlissel et al. |
| 2005/0204077 A1 | 9/2005 | Kou |
| 2005/0216731 A1 | 9/2005 | Saito et al. |
| 2005/0225547 A1 | 10/2005 | Choi |
| 2005/0249212 A1 | 11/2005 | Schoner |
| 2006/0015299 A1 | 1/2006 | McDermott et al. |
| 2006/0036788 A1 | 2/2006 | Galang et al. |
| 2006/0059092 A1 | 3/2006 | Burshan et al. |
| 2006/0117371 A1 | 6/2006 | Margulis |
| 2006/0133386 A1 | 6/2006 | McCormack et al. |
| 2006/0209890 A1 | 9/2006 | MacMullan et al. |
| 2006/0258216 A1 | 11/2006 | Konda |
| 2006/0271979 A1 | 11/2006 | Hejna, Jr. |
| 2006/0277589 A1 | 12/2006 | Margis et al. |
| 2007/0019684 A1 | 1/2007 | Zimmermann |
| 2007/0049086 A1 | 3/2007 | Sakane |
| 2007/0091815 A1 | 4/2007 | Peerapol et al. |
| 2007/0097885 A1 | 5/2007 | Traversat et al. |
| 2007/0115827 A1 | 5/2007 | Boehnke et al. |
| 2007/0140298 A1 | 6/2007 | Eng |
| 2008/0022023 A1 | 1/2008 | Kim et al. |
| 2008/0062201 A1 | 3/2008 | Bhatia et al. |
| 2008/0091439 A1 | 4/2008 | Baumgarte et al. |
| 2008/0126824 A1 | 5/2008 | Lee et al. |
| 2008/0175277 A1 | 7/2008 | Yin et al. |
| 2008/0278567 A1 | 11/2008 | Nakajima |
| 2008/0284761 A1 | 11/2008 | Knee et al. |
| 2010/0034106 A1 | 2/2010 | Hu et al. |
| 2010/0260296 A1 | 10/2010 | Chorney et al. |
| 2011/0063501 A1* | 3/2011 | Bar-Niv et al. ............... 348/474 |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| EP | 1 628 446 | 2/2006 |
| GB | 2 329 741 A | 3/1999 |
| JP | 03-153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO95/13681 | 5/1995 |
| WO | WO98/41008 | 9/1998 |
| WO | WO99/63513 | 12/1999 |
| WO | WO00/20974 | 4/2000 |
| WO | WO02/25822 A2 | 3/2002 |
| WO | WO02/25885 | 3/2002 |
| WO | WO02/65746 | 8/2002 |
| WO | WO03/058376 | 7/2003 |

OTHER PUBLICATIONS

Notice of Allowance dated Sep. 9, 2011 from U.S. Appl. No. 11/747,844.
Office Action dated Sep. 2, 2011 in U.S. Appl. No. 12/610,928.
Notice of Allowance dated Aug. 19, 2011 in U.S. Appl. No. 11/776,411.
Office Action dated Mar. 2, 2011 in U.S. Appl. No. 11/747,844.
Office Action dated Jun. 6, 2011, in U.S. Appl. No. 11/740,859.
Office Action dated Apr. 1, 2011 in U.S. Appl. No. 11/776,411.
Final Office Action dated Feb. 23, 2011 from U.S. Appl. No. 12/610,928.
Office Action dated Nov. 29, 2010 in U.S. Appl. No. 11/740,859.
Office Action dated Nov. 26, 2010 in U.S. Appl. No. 11/776,411.
Office Action dated Nov. 30, 2010 in U.S. Appl. No. 11/747,844.
European Search Report dated Sep. 22, 2010 in EP Application No. 10162586.1.
Lei et al., "Adaptive Video Transcoding and Streaming Over Wireless Channels," The Journal of Systems and Software 75 (2005) 253-270.
Notice of Allowance dated May 21, 2010 in U.S. Appl. No. 10/909,027.
Office Action dated Jun. 23, 2010 in U.S. Appl. No. 11/776,411.
Office Action dated Jun. 14, 2010 in U.S. Appl. No. 11/747,844.
Office Action dated Jun. 11, 2010 in U.S. Appl. No. 11/740,859.
Office Action dated Mar. 31, 2010 in U.S. Appl. No. 11/776,411.
Office Action dated Mar. 9, 2010 in U.S. Appl. No. 10/726,794.
Office Action dated Mar. 9, 2010 in U.S. Appl. No. 10/909,027.
Office Action dated Feb. 19, 2010 in U.S. Appl. No. 10/726,441.
Office Action dated Nov. 23, 2009 in U.S. Appl. No. 11/742,222.
Notice of Allowance dated Dec. 31, 2009 in U.S. Appl. No. 10/726,895.
Office Action dated Feb. 6, 2009 from Chinese Patent Application No. 200410038545.8.
Office Action dated Jan. 6, 2010 in U.S. Appl. No. 11/740,859.
Office Action dated Oct. 8, 2009 in U.S. .Appl. No. 11/776,411.
Office Action dated Jan. 11, 2010 in U.S. Appl. No. 12/137,458.
Office Action dated Nov. 12, 2009 in U.S. Appl. No. 10/726,350.
Office Action dated Sep. 11, 2009 in U.S. Appl. No. 10/726,441.
Office Action dated Sep. 10, 2009 in U.S. Appl. No. 10/909,027.
Office Action dated Sep. 17, 2009 in U.S. Appl. No. 10/726,794.
Universal Serial Bus Specification, Revision 2.0, Apr. 27, 2000, p. 143.
Office Action dated Sep. 21, 2009 in U.S. Appl. No. 10/726,895.
Office Action dated Mar. 4, 2009 in U.S. Appl. No. 10/726,350.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Barr, "Copy Protection for High-Definition Baseband Video," Information Technology: Coding and Computing [online at http://ieeexplore.ieee.org/stamp/stamp.jsp?arnumber=844202andisnumber=18266, Aug. 6, 2002.
Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.

(56) References Cited

OTHER PUBLICATIONS

Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 2, 2009 in U.S. Appl. No. 10/726,794.
Office Action dated Apr. 6, 2009 in U.S. Appl. No. 10/909,027.
Office Action dated May 26, 2009 in U.S. Appl. No. 11/742,222.
Examination Report dated Dec. 7, 2006 from European Patent Application No. 04252055.1.
Austrian Search and Exam Report dated Feb. 9, 2007 issued in corresponding Singapore Application No. 200401975-8.
Austrian Exam Report dated Apr. 30, 2007 issued in corresponding Singapore Application No. 200405336-9.
Australian Search Report dated May 15, 2007 issued in corresponding Singapore Application No. 200405099-3).
Austrian Search and Exam Report dated Feb. 16, 2007 issued in corresponding Singapore Application No. 200402060-8.
Search Report dated Oct. 7, 2005 from Singapore Patent Application No. 200405129-8.
Search Report dated Oct. 12, 2005 from Singapore Patent Application No. 200405115-7.
Search Report dated Dec. 2, 2005 from European Patent Application No. 04255610.0.
Search Report dated Dec. 8, 2005 from European Patent Application No. 04255609.2.
Search Report dated Jun. 30, 2006 from Singapore Patent Application No. 200405336-9.
Search and Exam Report dated Feb. 9, 2007 issued in corresponding Singapore Application No. 200401166-4.
Austrian Search and Exam Report dated Feb. 16, 2007 issued in corresponding Singapore Application No. 200401973-3.
Austrian Search and Exam Report dated Feb. 16, 2007 issued in corresponding Singapore Application No. 200401979-0.
Search Report dated Dec. 16, 2004 from European Patent Application No. 04255786.8.
Examination Report dated Feb. 28, 2006 from European Patent Application No. 04255609.2.
Austrian Search and Exam Report dated Feb. 16, 2007 issued in corresponding Singapore Application No. 200402061-6.
Search Report dated Mar. 15, 2006 from European Patent Application No. 04255610.0.
Office Action dated Apr. 4, 2008 in CN Patent Application No. 200410043419.1.
Office Action dated Sep. 12, 2008 in CN Patent Application No. 200410044503.5.
Examination Report dated Mar. 1, 2006 from Singapore Patent Application No. 200402057-4.
Office Action mailed Jul. 9, 2007 from related U.S. Appl. No. 10/726,895.
Office Action mailed Dec. 28, 2007 from U.S. Appl. No. 10/726,895.
Office Action dated Aug. 6, 2008 from U.S. Appl. No. 10/726,895.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Kobayashi, "DisplayPort Technical Overview," http://web.archive.org/web/20060726222849/http://gnss.com/technology/DisplayPort+Technical+Overview+White+Paper.pdf, Jun. 26, 2006.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
High-Definition Multimedia Interface Specification, Informational Version 1.0, Sep. 4, 2003, 52 pgs.
International Search Report in related Chinese Application No. 200410044503.5 dated Jun. 29, 2007.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
Eidson et al., "30.2: HDMI: High-Definition Multimedia Interface," Silicon Image, Inc., Sunnyvale, CA, SID 03 Digest, 2003, pp. 1024-1027.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from European Patent Application No. 04255609.2.
Office Action mailed Dec. 5, 2006 from U.S. Appl. No. 10/726,802.
VESA Display Port Standard, Version 1.1, Mar. 19, 2007.
Office Action mailed Jun. 26, 2007 from U.S. Appl. No. 10/762,680.
Office Action mailed Jun. 27, 2007 from U.S. Appl. No. 10/726,794.
EPO Exam Report in EP Application No. 04255786.8 dated Jul. 5, 2007.
Final Rejection mailed Sep. 21, 2007 from U.S. Appl. No. 10/909,103.
Notice of Allowance mailed Sep. 24, 2007 in U.S. Appl. No. 10/726,802.
Office Action dated Nov. 2, 2007 from Chinese Patent Application No. 2004100950502.4.
Supplemental Notice of Allowance mailed Nov. 6, 2007 in U.S. Appl. No. 10/726,802.
Office Action mailed Nov. 26, 2007 from U.S. Appl. No. 10/909,027.
Office Action mailed Nov. 27, 2007 from U.S. Appl. No. 10/726,794.
Office Action dated Jan. 8, 2008 in U.S. Appl. No. 10/762,680.
Office Action dated Jan. 23, 2008 from U.S. Appl. No. 11/747,839.
Notice of Allowance dated Jan. 29, 2008 in U.S. Appl. No. 10/726,802.
Notice of Allowance dated Mar. 5, 2008 in U.S. Appl. No. 10/909,103.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 in EP Application No. 04252054.4.
Chinese Office Action dated Mar. 28, 2008 in Chinese application No. 200410044503.5.
European Search Report dated Mar. 28, 2008 from EP Application No. 04252203.7.
European Search Report dated Mar. 28, 2008 from EP Application No. 04252057.7.
Office Action dated Mar. 31, 2008 from U.S. Appl. No. 10/726,794.
European Search Report dated Apr. 3, 2008 from EP Application No. 04252205.2.7.
Chinese Office Action dated Apr. 4, 2008 in Chinese Application No. 200410047784.X.
Office Action dated Apr. 9, 2008 from U.S. Appl No. 10/909,027.
Notice of Allowance dated Apr. 25, 2008 from U.S. Appl. No. 10/726,802.

(56) References Cited

OTHER PUBLICATIONS

Office Action dated May 23, 2008 from Chinese Patent Application No. 200410071498.7.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 23, 2008 from U.S. Appl. No. 10/762,680.
Office Action dated Jun. 24, 2008 from U.S. Appl. No. 10/726,794.
Chinese Office Action dated Jun. 27, 2008 from Chinese Patent Application No. 200410038432.8.
Chinese Office Action dated Jun. 27, 2008 in Chinese Application No. 200410038546.2.
Office Action dated Jun. 27, 2008 from U.S. Appl. No. 10/909,085.
Search Report dated Jun. 30, 2008 in EP Application No. 08155262.2.
Search Report dated Jul. 2, 2008 in EP Application No. 08155263.0.
Office Action dated Jul. 2, 2008 from European Patent Application No. 04252205.2.
Office Action dated Jul. 4, 2008 from Chinese Patent Application No. 200410038545.8.
Search Report dated Jul. 10, 2008 from European Patent Application No. 08153726.8.
Search Report dated Jul. 21, 2008 from European Patent Application No. 08153724.3.
Office Action dated Aug. 1, 2008 in U.S. Appl. No. 10/909,027.
Office Action dated Aug. 8, 2008 from Chinese Patent Application No. 200410045686.2.
Office Action dated Aug. 8, 2008 from Chinese Patent Application No. 200410087460.9.
Office Action dated Aug. 19, 2008 from U.S. Appl. No. 10/726,440.
Office Action dated Aug. 29, 2008 from U.S. Appl. No. 11/742,387.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl.n No. 10/762,680.
Kasai N. et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
High-bandwidth Digital Content Protection System, Revision 1.0, Intel Corporation, Feb. 17, 2000.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Final Office Action dated Dec. 7, 2011 in U.S. Appl. No. 11/740,859.
Notice of Allowance dated Feb. 21, 1012 in U.S. Appl. No. 11/740,859.
U.S. Appl. No. 61/348,878, filed on May 27, 2010.

* cited by examiner

LEVEL SHIFTING CABLE ADAPTOR AND CHIP SYSTEM FOR USE WITH DUAL-MODE MULTI-MEDIA DEVICE

CROSS REFERENCE TO RELATED APPLICATIONS

This patent application takes priority under 35 U.S.C. 119 (e) to U.S. Provisional Patent Application No. 61/348,878 filed on May 27, 2010, entitled "ELIMINATING THE NEED FOR MULTIPLEXING I2C AND AUX SIGNALS OVER THE SAME PAIR OF WIRES" by Kobayashi, which is hereby incorporated by reference herein in its entirety. This application is also related to the following co-pending U.S. Patents and Patent Applications, each of which are incorporated by reference: i) U.S. Pat. No. 7,068,686, filed Dec. 2, 2003 and issued Jun. 27, 2006, entitled "METHOD AND APPARATUS FOR EFFICIENT TRANSMISSION OF MULTIMEDIA DATA PACKETS" naming Kobayashi as inventor; ii) U.S. Pat. No. 7,487,273 filed Jul. 29, 2004 and issued Feb. 3, 2009, entitled "DATA PACKET BASED STREAM TRANSPORT SCHEDULER WHEREIN TRANSPORT DATA LINK DOES NOT INCLUDE A CLOCK LINE" naming Kobayashi as inventor; iii) U.S. Pat. No. 7,620,062 filed on Dec. 2, 2003 and issued on Nov. 17, 2009, entitled "METHOD OF REAL-TIME OPTIMIZING MULTIMEDIA PACKET TRANSMISSION RATE" naming Kobayashi as inventor; iv) U.S. Pat. No. 7,088,741, filed Dec. 2, 2003 and issued Aug. 8, 2006, entitled "USING AN AUXILIARY CHANNEL FOR VIDEO MONITOR TRAINING" naming Kobayashi as inventor; and v) U.S. patent application Ser. No. 10/726,794 filed on Dec. 2, 2003, entitled "PACKET BASED VIDEO DISPLAY INTERFACE AND METHODS OF USE THEREOF" naming Kobayashi as inventor.

TECHNICAL FIELD

The present invention relates generally to communication methodologies and systems enabling the interconnection of a dual-mode source device to a downstream device using an adaptor capable of supporting dual-mode sideband communication. Supporting methods and systems are described for supporting advanced level shifting in a cable adaptor used in a multimedia network.

BACKGROUND OF THE INVENTION

Currently, multimedia source and sink devices are constructed to operate using specified communication protocols and associated connector formats. In communicating multimedia data from source devices to multimedia sink devices a number of communication protocols and connector formats are in use.

In one data format a source can be configured to transmit multimedia content over a main link comprising four data pairs of connectors with each pair defining a main link data lane. Additionally, supplementary data is transmitted using a pair of data lines arranged in a sideband channel. In one format the main link data can be configured to use up to four data lanes, each lane comprising a differential pair. In one approach multimedia content can be configured as a main link signal and associated sideband signal. In one format the main link signal comprises a packetized, AC-coupled, ANSI 8B/10B encoded main link data having embedded timing information that obviates the need for a clock line and transmitted over these four channels. Additionally, in this format, a sideband channel (auxiliary channel) comprising a pair of wires can carry associated sideband data configured as a packetized, AC-coupled, Manchester II encoded data using an AUX line communication protocol with embedded timing information that also obviates the need for a separate clock line for the sideband signal. In one implementation this format can comprise the first primary data transmission format used by a dual-mode source. One mode of such a data transport method and protocol is described in U.S. Pat. No. 7,487,273 which incorporated by reference hereinabove.

In one particular implementation, the first primary data transmission format can comprise the widely known and used DisplayPort® format such as specified, for example, by the Video Electronics Standards Association (VESA) Versions 1.1, 1.2, (hereby incorporated by reference) as well as others. As is known this format includes a main link with four data lanes for transmitting multimedia data. And also a bi-directional half-duplex side band communication channel using a pair of lines (AUX lines) that can carry device management and device control data for the Main Link. Examples of such supplementary data includes, but not limited to link training information, content protection, EDID (Extended Display Identification Data), E-EDID (Enhanced EDID), DPMS (Display Power Management Signaling), MCCS (Monitor Command Control Set), HDCP (High-bandwidth Content Protection), DPCP (DisplayPort Content Protection) and wide range of other information.

In another data format (referred to herein as a second format), a sink can be configured to receive multimedia content over a main link comprising four data pairs of connectors with each pair defining a main link data lane. In this second format the main link data is configured as four differential pairs arranged as three data lanes (three differential pairs) and a clock lane (a single differential pair) for supporting an associated clock signal. Additionally, supplementary data associated with the main link content is transmitted using a pair of data lines arranged in a sideband channel. The multimedia content of the main link is configured as a digitized, DC-coupled, TMDS (Transition Minimized Differential Signaling) encoded main link signal with associated timing information transmitted over the clock line. The sideband channel carries supplementary information configured as a digitized, DC-coupled, Manchester 2 encoded, I²C (Inter-Integrated Circuit) compatible sideband signal with a data line and an associated clock line carried over the pair of wires comprising the sideband channel. As indicated above, this data format and associated connector format (or footprint) shall be referred to in this specification a "second format".

One particular implementation of the second format is the commonly known DVI (Digitital Video Interface) and its closely related HDMI (High Definition Multimedia Interface). DVI/HDMI uses a four data pair main link with a two line sideband link. The main link supports three data lanes with the fourth lane supporting an associated clock signal. As above, DVI/HDMI main link signal is configured as a digitized, DC-coupled, TMDS encoded signal with associated clock line.

In DVI/HDMI the DC-coupled sideband pair are configured as a DDC (Display Data Channel) that communicates additional data related to the main link data. In particular the sideband channel includes a "clock line" (DDC_CLK) and a "data line" (DDC_SDA). Examples of such data include, but are not limited to device management and device control data for the Main Link signals. Such a DDC includes one line dedicated to DDC clock signals and the other line for DDC data signaling. In such a format the sideband signal comprises digitized, DC-coupled, I²C compatible signal comprising data and clock line.

Although both formats use quite dissimilar data communication protocols and connector interface formats, there are some similarities between the two communication formats. For one, both use a four channel main link and a two channel sideband link. Thus, there is some potential for inter-compatibility of these devices.

Existing approaches have been used to accommodate this translation. However, while existing systems and methods work well for many applications, there is an increasing demand for approaches that provide improved performance and can improve dual-mode source sideband performance to enable the display of audio-video data in a wider range of operational circumstance and with far greater capacity to fully enjoy the benefits of modern multimedia equipment, software and devices. This disclosure addresses some of those needs.

SUMMARY OF THE INVENTION

In a first aspect, an embodiment of the invention comprises an adaptor. The adaptor enabling data transmission from a dual-mode source device having a first primary data format to a sink device configured to receive data in a second dissimilar data format. The adaptor including a source format detector module that enables the adaptor to identify whether a dual-mode source device coupled with the adaptor provides multimedia data in a second mode or a third mode. Comprises a main link level shifting module for converting either a second mode main link signal or a third mode main link signal to a DC-coupled main link output signal. Further comprising a sideband signal processing module suitable for processing the second mode sideband signal and configured to process an AC-coupled second mode side band signal having a clock signal and a data signal by level shifting the second mode sideband signal to generate a DC-coupled sideband signal with the clock signal and data signal for output to the sink device. Further comprising a sideband signal processing module suitable for processing the third mode sideband signal and configured to process an AC-coupled third mode sideband signal comprising a packetized data signal with embedded clock by converting the third mode sideband signal to a DC-coupled sideband signal with the clock signal and data signal for output to the sink device. In particular where said second mode sideband signal comprises a digitized, AC-coupled, Manchester II encoded sideband signal using an I²C communication protocol having a data signal and a clock signal and where the sideband processing module is configured to level shift the second sideband signal generating an output digitized, DC-coupled, Manchester II encoded sideband signal using an I²C communication protocol having a data signal and a clock signal. And wherein the third sideband signal comprises a packetized, AC-coupled sideband signal using an I²C over AUX communication protocol having an embedded clock signal. And wherein the third sideband signal processing module is configured to convert the third sideband signal into an output digitized, DC-coupled sideband signal using an I²C communication protocol having a data signal and a clock signal.

In another aspect of the invention a computer chip system that enables dual-mode multi-media source operation enabling data transmission in two different multimedia data transmission modes is disclosed. Such a system includes a source format detector circuitry enabling identification of a source as producing multimedia data in a second mode or a third mode. Further including main link level shifting circuitry for converting a second mode main link signal and a third mode main link signal from an AC-coupled main link signal to a DC-coupled main link signal. Further including second sideband signal processing circuitry configured to process an AC-coupled second mode side band signal that includes a clock signal and a data signal by level shifting the second mode sideband signal to generate a DC-coupled sideband signal with the clock signal and data signal for output to the sink device. Further including third sideband signal processing circuitry configured to process an AC-coupled third mode sideband signal comprising a packetized data signal with embedded clock by converting the third mode sideband signal to a DC-coupled sideband signal with the clock signal and data signal for output to the sink device.

In another aspect of the invention, a computer chip system that enables dual-mode multi-media source operation is disclosed. The chip includes i) a main data link having four data lanes comprising a pair of data lines each; ii) a sideband channel comprising two sideband lines; and iii) a processor for formatting multimedia source data into two alternate data transport modes suitable for transport using the four main link lanes and the two sideband lines of the sideband channel. Wherein the data transport modes include a) in a first data transport mode configured such that a first main link signal is transmitted over four data lanes of a main link as a packetized, AC-coupled, ANSI 8B/10B encoded signal with embedded timing data enabling data transmission without a clock line, and a first sideband signal, associated with the first main link signal, is transmitted using the two sideband lines of the sideband channel to carry the first sideband signal comprising a packetized, AC-coupled, Manchester II encoded signal with embedded timing data enabling data transmission without a sideband clock line and also b) in the third data transport mode configured such that a third main link signal is transmitted over the four data lanes of the main link using three data lanes of the main link and using a fourth lane as an associated clock line, the third main link signal transmitted as a digitized, AC-coupled, TMDS encoded main link signal having clocking information transmitted over said fourth lane, and a third sideband signal, associated with the third main link, comprising an AC-coupled, Manchester II encoded signal transmitted over the two sideband lines as a sideband data signal with embedded timing data enabling data transmission without a sideband clock line using an I²C over AUX communication protocol.

And in another aspect, the invention comprises a method of coupling a first format dual-mode multimedia source device with a second format multimedia sink device using an adaptor arranged between the source and sink devices. The method involves receiving a source signal from the dual-mode source, the source signal configured as one of i) a second mode source signal having a main link signal and a second mode sideband signal or of ii) a third mode source signal having the main link signal and a third mode sideband signal. Involves determining a source type for the dual-mode source. Involves converting the received main link signal into a final format main link signal having a format that is different than the received main link signal and that is compatible with the second format multimedia sink device. Involves, for a first type source, receiving the second mode sideband signal and converting the second mode sideband signal into a final format sideband signal suitable for output as an output sideband signal compatible with the second format multimedia sink device. Involves, for a second type source, receiving the third mode sideband signal and converting the third mode sideband signal into the final format sideband signal suitable for output as the output sideband signal compatible with the second format multimedia sink device. And involves outputting the final format main link signal and the final format sideband signal.

General aspects of the invention include, but are not limited to methods, systems, apparatus, and computer program products for enabling multimedia data transmission in multimedia device networks. Aspects include improved dual-mode source devices and improved dual-mode adaptor connectors.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF PREFERRED EMBODIMENTS

Figure 1A:
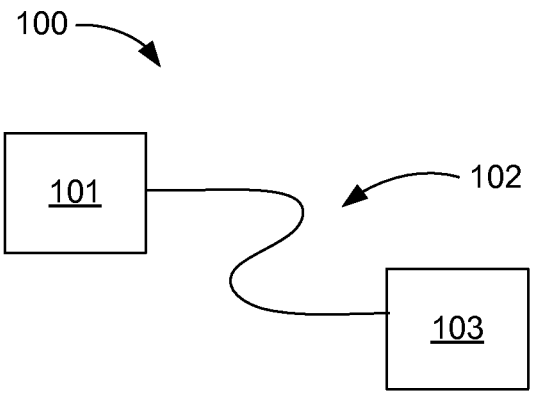
FIGS. 1(a) and 1(b) illustrate examples of simplified network embodiments of a multi-media network in accordance with the principles of the invention.

Reference is made to particular embodiments of the invention. One example of which is illustrated in the accompanying drawings. While the invention will be described in conjunction with particular embodiments, it will be understood that it is not intended to limit the invention to the described embodiments. To the contrary, it is intended to cover alternatives, modifications, and equivalents as may be included within the spirit and scope of the invention as defined by the appended claims.

Originally source devices were constructed such that the data output of the source device conformed to a certain specified standard. Similarly, compatible sink devices were configured to receive the data output of the source device conformed to the specified standard. However, as the number of standards expanded format incompatibility issues limited the utility of devices. Cross-compatibility became important as efforts were made to enable communication between devices supporting incompatible data formats. For example, DisplayPort compatible devices could not communicate with DVI/HDMI compatible devices and so on.

In an effort to address some of these problems, so-called dual mode multimedia devices were developed. Such dual mode sources can output data signal in more than one format thereby enabling a dual-mode source device to provide content to sink device of a supported set of formats. Typically, this was facilitated through the use of a rather simple adaptor configured for such a purpose.

In one known approach, a dual-mode source uses a switching device to enable source operation in either of a pair of supported data transmission modes. For example a dual-mode device may be constructed to operate in a DisplayPort format and also, when assisted by an adaptor, also transmit data suitable for receipt by another format sink device, for example, a DVI/HDMI compatible sink device.

Although this is valuable in terms of flexibility in system operations, in current implementations, it is also accompanied by a few drawbacks. In particular, the presence of switching circuitry in the source imposes certain performance limitations on the source device. In one example, a dual-mode source device can be configured to transmit data in a first primary data transmission format to a first format sink device or alternatively configured to transmit signal in an alternative format suitable for receipt by a second format sink device. In the latter case an adaptor is used to enable full compatibility with the second format sink device.

When this dual-mode source is used to communicate with a first format sink device, a rather straightforward communication from source to sink can be accomplished via a standard communication link. For example, where the first primary data format of the dual-mode source is a DisplayPort compatible format and the sink format is also a DisplayPort compatible format a rather straightforward communication occurs using an ordinary DisplayPort connector. However, when the same dual-mode source device is used with a second format sink device such that the first primary data format and second format are incompatible, the dual mode source provides a different mode of communication. For example, when the dual-mode source having DisplayPort as a primary format seeks to communicate with a DVI/HDMI sink device. Accordingly, an alternate format signal is transmitted by the source such that an adaptor arranged between source and sink can convert the signal to a format compatible (i.e., the second format) with the sink device.

Thus, the dual-mode source is capable of transmitting data in two different formats. To enable this function in existing devices, a dual-mode source uses a switch to enable two types of sideband signal to be communicated thereby enabling interchangability between the two formats. One of the drawbacks of such a switch is a parasitic capacitance induced by the switch can cause reduced data rate in the effected sideband channel. The presence of this switch reduces the performance of the sideband channels operating in either mode whether the switching to another format is required or not. Thus, the presence of the switch can reduce performance in situations where the switch would not ordinarily be required. For example, when a dual-mode source (having a first primary data format) is coupled with a first format sink device. In this case parasitic capacitance of the switch and its attendant reduced data rate affect the system even though there is no need for conversion to a second data format. In one aspect of the invention, embodiments of the invention solve this problem.

Aspects of the invention pertain to methods and systems for enabling multimedia data transmission from dual-mode multimedia source devices to downstream sink devices.

In one existing approach, dual-mode source devices have been developed to transmit data configured in more than one data format. In one such system, a dual-mode source device is capable of transmitting data in a first format (also referred to herein as "primary data transmission format", "first primary data format" or a "primary data format") compatible with first format downstream devices such as sinks or branch devices. Such connection in this first format is rather unremarkable and requires only standard connections between the dual-mode source and the first format sink devices.

This first format comprises a first format main link signal and an associated first format sideband signal. The main link signal is configured as a packetized, AC-coupled, 8B/10B encoded signal with embedded clock data. This data is configured such that it is self-clocking and can be transported over all four data channels of a main link (rather than requiring a dedicated clock line). The sideband signal is configured as a packetized, AC-coupled, Manchester II encoded signal with embedded clock data. This data is transmitted over a differential pair of sideband channel. Additionally, this signal can be encoded in accordance with an AUX channel protocol specified in the VESA DisplayPort® standard Versions 1.1, 1.2.

However, where the dual-mode source device is coupled with a sink device designed to receive input in a second format, another data transmission approach is required. Accordingly, the dual-mode source outputs data configured in an alternate configuration. In existing designs, this alternate data configuration is not immediately compatible with a second format device. Accordingly, an adaptor is introduced into the link between the dual-mode source (outputting data in the alternate format) and the second format sink device. The adaptor completes the reconfiguration of the alternate format so that it is compatible with the second format sink device.

However, as explained above there are some problems with this approach. Accordingly, there is need for improved dual-mode source and adaptor devices. Moreover, such improved devices, advantageously constructed, can provide compatibility with existing format devices.

Generalized Network Embodiment

In the ordinary operation of multimedia systems, a number of sink devices, source devices, as well as other network devices (routers, splitters, etc.) are linked together in a multimedia network. FIG. 1(a) illustrates a highly simplified example of a multimedia network 100 comprising a source device 101 and a sink device 102 linked by a data link 103. In this implementation, the source device 101 is a dual-mode source device.

In a particular embodiment, source devices 101 include, but are not limited to any device capable of producing or transmitting multimedia content. In particular, this invention relates to a dual-mode source device capable of transmitting multi-media content in two different modes depending on the processing capability of the downstream device. As used in describing the embodiments of this invention, a multimedia signal transmitted by the dual-mode source comprises multimedia data that shall be interpreted broadly. Moreover, throughout the specification and claims multimedia content shall include audio-video content as is intended for use with electronic devices and includes, but is not limited to mixed media, text, audio, still images, animation, video, interactive content, as well as a wide range of associated content and combinations of all of the foregoing.

Again, in general, source devices 101 are those devices that capture, generate, or transmit multimedia content. Particular source devices 101 include, but are not limited to set top boxes, DVD players, cameras, video recorders, game platforms, computers, HD video devices, cellular phones, smart phones, personal electronic devices, VCR devices, radio, satellite boxes, music players, content capture and content generation devices, and many other such source devices beyond those referenced above. In particular, dual-mode devices are configured to deliver multimedia content in at least two data configuration formats thus enabling connectivity with non-native format devices in a multimedia network.

The network 100 can further include one or more sink devices 102. As used herein, example sink devices 102 can comprise any device capable of receiving and/or consuming multi-media content. For example, particular embodiments can include, but are not limited to, audio devices, display devices, stereo equipment, receivers, televisions, game devices, and many other such audio-video sink devices.

Other network devices applicable to this invention include, but are not limited to multimedia hubs, splitters, concentrators, switchable devices with many inputs and fewer outputs, replicators, concentrators, and many other types of branch devices that can link various combinations of components together. These branch devices modernly are mixed with standard sink/source capabilities and so are well suited to applications of this invention. It should be noted that many devices combine traditional source and sink functionalities, and also such network devices can include a wide range of devices combining other of these functions.

Figure 1B:
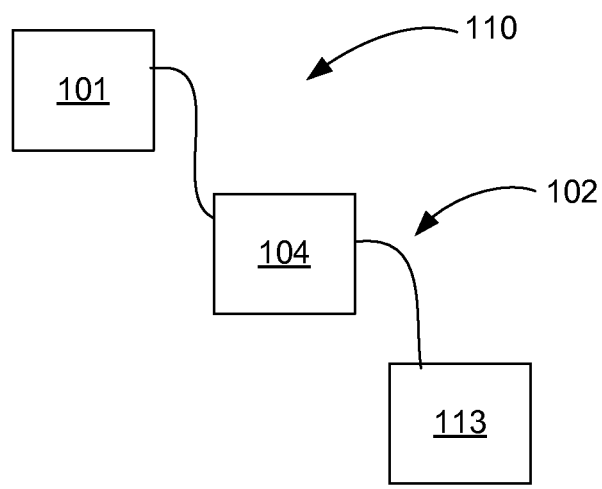

In another aspect of the invention, FIG. 1(b) illustrates a network 110 having a dual-mode source device 101. The dual-mode source device 101 can be configured with a primary data transmission format. This format is such that when it is connected with a sink device supporting the same data format a standard connection can be made between the source and sink devices that does not require an adaptor. However, such a dual mode source 101 is advantageously configured to enable communication with a sink device 113 configured to receive data in a different data format. Additionally, the dual-mode source 101 is capable of providing signal to two different data configurations, a first primary data format, or another format configured to be adaptable to a second format sink device. In this network, the sink 113 is configured to receive data configured in a second format that is dissimilar to the first primary data format source 101. Additionally, the link 102 between the source 101 and sink 113 can require an adaptor 104 to enhance the interconnection between the dual-mode source 101 and the second format sink 113. FIG. 1(b) provides a highly simplified example of this multimedia network 110.

Legacy Dual Mode Source Device Concerns

Figure 2:
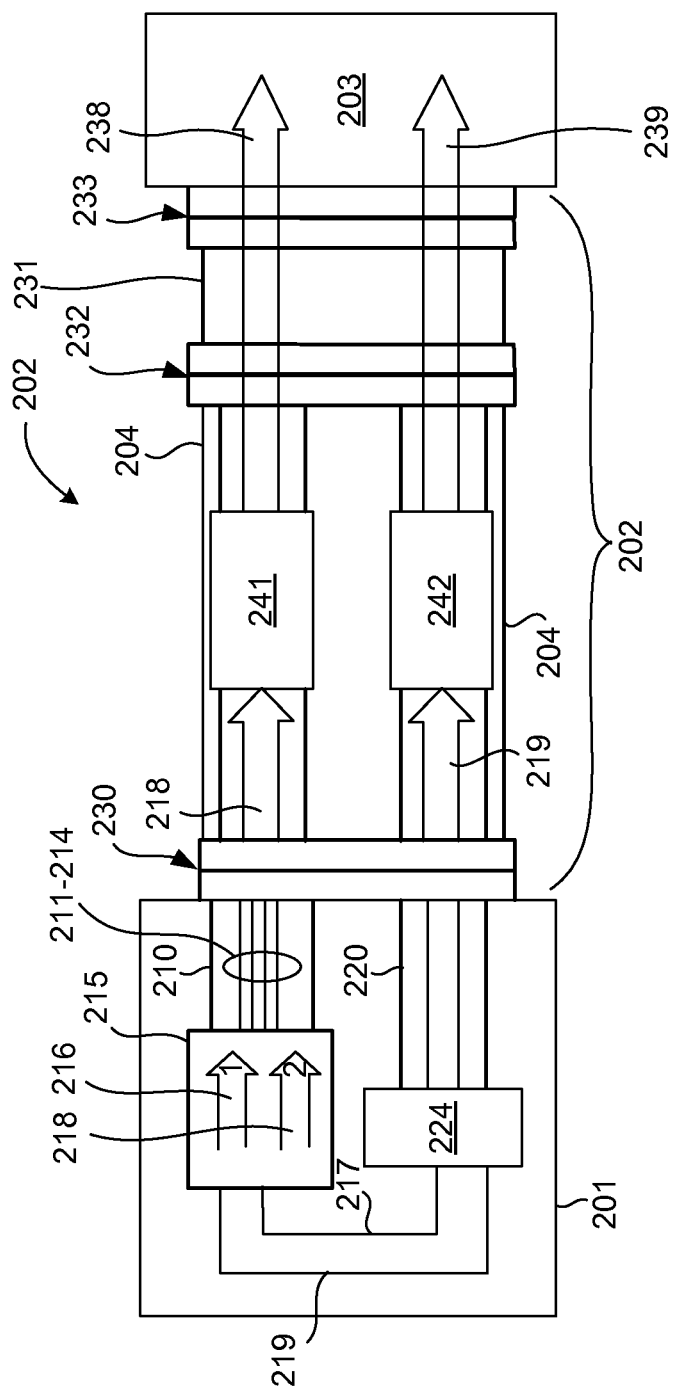
FIG. 2 diagrammatically illustrates a multimedia network system including a type 1 dual-mode source and an adaptor configured to translate a first format source signal into an appropriate second format output signal suitable for receipt by a sink device in accordance with an embodiment of the present invention.

FIG. 2 illustrates a dual mode system for use between a dual mode source 201 (having a first primary data transmission format) coupled with a second format sink device 203 by way of a link 202 having an adaptor 204. In this generalized environment the source 201 is a dual-mode source device capable of transmitting multimedia content in the first format and another data configuration. This depicted source 201 comprises a first type of dual-mode source (i.e., a type 1 dual mode source) configured to deliver data in two specific data configurations to be described below. Modes of operation and general description for a type 1 source 201 are provided below.

In a first format (the first primary data transmission format), the type 1 dual-mode source 201 delivers multimedia content for consumption by a first format sink device. Thus, both the source and sink are configured to process first data format signal. Such a first primary data transmission format uses a standard video transmission cable (or other connector) configured for first format connector interfaces on either end. As stated above, this a rather ordinary configuration. A first format signal comprises a main link signal and a sideband signal, delivered using a main link and a sideband channel. The main link signal of such a first format signal can be transmitted over 1, 2, 3, or 4 of the main link channels of the main link. As stated above, this first format includes a main link signal comprising a packetized, AC-coupled, ANSI 8B/10B encoded signal with timing information embedded into data packets of the of the signal. An associated first format sideband channel delivers auxiliary and ancillary data relating to the data and/or the network devices to the first format sink device. Also, as described above a first format sideband signal is transmitted over the two lines of a sideband channel as a packetized, self-clocked, AC-coupled, Manchester II encoded signal. Accordingly, using such a type 1 dual-mode source, data transmission in the first format from the dual-mode source to first format sink is straightforward.

However, where the downstream device is a second format sink device 203 the first format dual-mode source device 201 can deliver the content in a different configuration referred to herein as a second mode signal (describing an alternative data transmission format).

A method of communicating data from a type 1 dual-mode source to a second format sink device is described in the following paragraphs.

With reference to FIG. 2, when a first format (also referred to herein as a type 1) dual mode sink device 201 is coupled with a second mode sink device 203 the link 202 between the two includes an adaptor (here a type 1 adaptor) 204 that assists in formatting source content for use by the second format sink device.

In one link 202 embodiment (of which many alternatives are possible), the type 1 dual-mode source 201 is coupled with the type 1 adaptor 204 using an interface 230 having, for example, a plug and receptacle arrangement. Additionally, the type 1 adaptor 204 can be coupled with an ordinary cable 231 using an interface 232 that can also comprise a plug and receptacle arrangement. This cable 231 can then be coupled with the sink 203 using an interface 233 comprising, for example, a plug and receptacle arrangement. It is contemplated that the arrangements of the interfaces, adaptor, and cables can be configured with a wide range of variation and are in no way limited to the specific arrangement depicted here. For example, the cable 231 can include several cables or be moved to the other end of the adaptor comprising an interconnection between the source 201 and the adaptor 204 and so on.

The type 1 source device 201 includes a processor 215 for operating upon and processing multimedia content and associated data. The processor 215 can use an active protocol convertor to configure the data in one of a first data format (associated with the first primary data format) or a first alternative format data transmission configuration (i.e., a second mode signal). When transmitting a first format signal, the processor 215 configures the multimedia content into a first format main link signal 216 (as described above) and an associated first format sideband signal 217 (as described above). Alternatively, the processor 215 can configure the signal for delivery to a second format sink device (as shown here, sink 203). In this alternate configuration the processor provides a second mode signal comprising a second mode main link signal 218 and an associated second mode sideband signal 219.

Additionally, the type 1 dual-mode source 201 includes a main data link 210 and a sideband channel 220 that are coupled with the adaptor 204 to enable data transmission to downstream devices. As explained above, the main link 210 includes four main link data pairs (lanes) 211-214 arranged to output main link multimedia data. Additionally, ancillary and supplementary data associated with the main link signals are transmitted using the sideband channel 220 (having two link lines).

As described generally above, when connected with a first format sink the source 201 configures the data as a first format multimedia content with a first mode main link signal 216 sideband signal 217. Accordingly, the processor 215 can produce first format signal (216, 217) or second mode signal (218, 219). This sideband signals (either 217, 219) are output from the processor 215 to a switch circuit 224. When connected with a first format sink device, the switch 224 enables the first format sideband signal 217 pass to a first format sink 203 through the two lines of the half-duplex bi-directional sideband link 220. One example of such a first format is a DisplayPort® data transmission format. When connected with a second format sink device 203, the switch 224 enables the second format sideband signal 217 pass to the link 202 (and associated adaptor 204) through the two lines of the half-duplex bi-directional sideband link 220.

Use of a Second Mode Signal Associated with a Legacy Dual Mode (Type 1) Source Device As pointed out above, a type 1 dual-mode source 201 incorporates a switching system 224 for selecting operational modes for the sideband signal 217, 219 in the source 201 depending on the nature of a sink device 203. Thus, when the type 1 dual-mode source 201 is coupled with a second format sink 203 the source 201 transmits multimedia content in a second mode signal (218, 219).

The second mode main link signal 218 is carried by 1-3 main link lanes with an associated fourth lane carrying a clock signal (211-214) of the main link 210. As indicated above, main link signal 218 comprises a digitized, AC-coupled, TMDS encoded data signal having an accompanying clock signal. However, the second format sink 203 requires a DC-coupled main link signal. Accordingly, an adaptor 204 is required to convert this "intermediate format" main link signal 218 into a form suitable for introduction into sink 203. The data of the second mode main link signal 218 is transmitted using the three data lanes (211-213) (or a portion thereof) with the fourth main link lane forming clock line 214. This second mode main link signal is provided to the interface 230 where it is output to the adaptor 204 of the link 202.

Additionally, the second mode sideband signal 219 comprises an AC-coupled, Manchester II encoded signal using an I²C communication protocol having a clock signal such that the two lines of the sideband channel operate as a data line and a clock line.

The switch 224 enables the two different modes of sideband signal to be selected depending on sink type. When a standard connection with first format sink is desired, the switch selects sideband 217 However, when the source 201 is connected with a second format sink 203, the switch 224 inputs the second mode sideband signal 219 into the sideband channel 220. Thus, the adaptor is supplied a second mode signal comprising second mode main link signal 218 and second mode side band signal 219.

The adaptor operates to conduct a final configuration that makes the second mode signal (218, 219) compatible with the second format device 203. The adaptor 204 includes a level shifter 241 that operates on the second mode main link signal 218.

The level shifter 241 receives the intermediate format second mode main link signal 218 through the main link 210 (lanes 211-214) and then processes the main link data 218 by "pulling up" the AC-coupled intermediate format signal 218 to generate a DC-coupled signal 238 that is output from the adaptor 204 to the downstream device 203 using the main link of the adaptor 204. In one example, the received intermediate format AC-coupled second mode main link signal 218 is pulled up to generate a DC coupled signal in the range of about 5 V. Thus, a suitable digitized, DC-coupled, TMDS encoded, main link signal 238 (including a clock line) is output from the level-shifter 241 through the four data lanes of the main link into second format source 203. It is pointed out that the embodiments of the device can include one or more level shifters arranged to enable level-shifting to be applied to signal transmitted through all four lanes.

Also, a sideband convertor 242 can be used to conduct a final configuration of the second mode sideband signal 219 enabling compatibility with the second format device 203. The convertor 242 receives the intermediate format second mode sideband signal 219 through sideband channel 220 and then processes the sideband signal 219 by "pulling up" the AC-coupled intermediate format sideband signal 219 to generate a DC-coupled sideband signal 239 that is output from the adaptor 204 to the downstream device 203 using the sideband channel of the adaptor 204. In one example, the received intermediate format AC-coupled second mode sideband signal 219 is pulled up to generate a DC-coupled signal in the range of about 5 V. Thus, a suitable digitized, DC-coupled, Manchester II encoded signal using an $I^2C$ protocol and having a data line and clock line is output from the convertor 242 into second format source 203. It is pointed out that the embodiments of the device can include the converting can be conducted instead by the level-shifter 241. One format for this output sideband signal 239 signal is a DDC (Display Data Channel) signal having a DDC_CLK (DDC clock) signal and a DDC_DAT (DDC data) signal.

To summarize, the first format is employed when the type 1 dual-mode source 201 is coupled with a first format sink device. In one example, where a DisplayPort® compatible source is connected with a DisplayPort® sink device. The second mode is employed when a second format sink device 203 is introduced into the system. The type 1 dual-mode source 201 reconfigures its data into a second mode suitable (218, 219) for transmission to an adaptor 204 and then to a second format sink device 203. This operation was explained above. One such example can include a network where, where a DisplayPort® compatible dual-mode source is connected with a DVI/HDMI sink device.

As was explained above, the presence of the switch 224 introduces parasitic capacitance into the system whether operating with a first format sink or a second format sink. This becomes increasingly problematic when higher data rates are being used in a sideband signal. The problem becomes steadily worst and at data rates of 500 Mb/s or greater becomes a serious impediment. This limitation is less of a problem for second format signal that for first format signal. Thus, it would be advantageous to construct a system that does not suffer from this performance decline in first format operation. This disclosure further discusses adaptors and dual-mode sources capable of enabling this objective. In particular, in one aspect the invention discloses a new type of dual-mode source device that does not suffer from some of the limitations described herein. Also, a new adaptor is described herein that enables the operation with both the type 1 dual-mode source device and the new dual-mode source device. Thus, the adaptor provides backward compatibility with older devices while also enabling operation with the newer source device.

Type 2 Dual-Mode Source Device

Another approach uses second type of dual-mode source 301 (type 2) capable of transmitting dual-mode signals without using the switch 224. Additionally, a second type of adaptor is disclosed that not only adapts the source signals for use in a second format sink, but also enables a high degree of backward compatibility with legacy dual-mode source devices thereby enabling operation with older dual-mode source devices as well as improved newer dual-mode source devices. Also, in these embodiments, several different types of associated semiconductor chip implementations are disclosed.

Figure 3A:
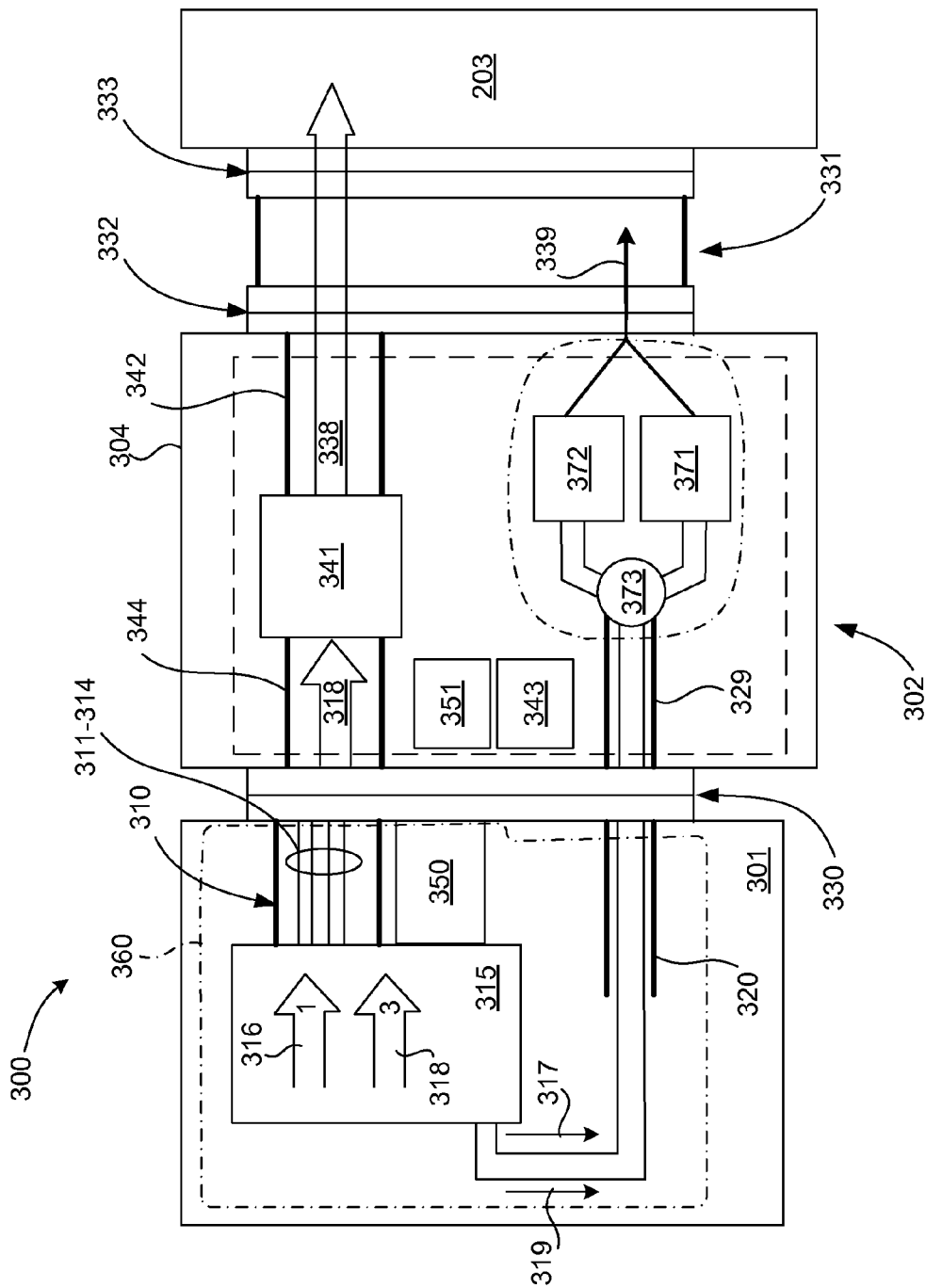
FIG. 3(a) diagrammatically illustrates a multimedia network system including a type 2 dual-mode source and an adaptor configured to translate an input source signal having yet another data format into an appropriate second format output signal suitable for receipt by a sink device in accordance with an embodiment of the present invention.

FIG. 3(a) provides a schematic depiction of another system 300 for handling improved dual-mode sources as well as legacy systems. In this embodiment a type 2 dual-mode source device 301 is configured to supply a alternative signal that is different than known devices. Such is coupled with a type 2 adaptor to produce an output that is compatible with the second format sources described above.

In one embodiment, a type 2 dual-mode source device 301 operates to produce a first type of signal associated with first primary data format described above. Such format is readily transmitted to a first format sink device using a standard first format cable and without the need for an adaptor. In this way, the type 2 (301) and type 1 (201) sources are similar. A type 2 dual-mode source 301 is configured to provide an alternate format data signal as is a type 1 source 201. However, the alternate data format provided by a type 2 source is markedly different from the second mode signal described above with respect to type 1 dual-mode source 201. Accordingly, the alternate format signal produced by the type dual-mode source 301 is referred to as a third mode signal.

FIG. 3(a), is used to provide a brief description of a type 2 dual-mode source device 301. A type 2 dual-mode source 301 includes a number of electronic systems and modules that enable functionality. In one embodiment, these elements can be included in a system on a chip electronic 360 configured to enable source operation. Alternatively, the system 360 can be embodied in several chips or circuit boards of great variety and is capable of performing some or all of the functions described as follows. Such a chip system can comprise a microprocessor or application specific integrated circuits and can also include software instructions stored on tangible computer readable media to include embedded firmware As stated above, the depicted "type 2" dual-mode source 301 operates somewhat differently than the type 1 source described above. In particular, the type 2 source 301 employs a different alternative format for its signal that is transmitted to a second format sink device 203.

As shown, in FIG. 3(a), a type 2 dual mode source 301 is coupled with a downstream sink device 203 using a link 302 having a type 2 adaptor 304 introduced into the link 302 between the source 301 and sink 203 devices. A general description of a type 2 source 301, type 2 adaptor 304 and an associated system 300 follows.

In this system, the second format sink device 203 is a device of substantially the same type as the second format sink device 203 described above. Accordingly, the sink device 203 is configured to receive second format source data over the four main link lanes and two lines of the sideband channel. In particular, it is configured to receive second format main link data comprising DC-coupled, TMDS encoded signal arranged configured as data signals transmitted over one, two, or three of the main link channels and with a clock signal transmitted over one of the main link channels. As before, the sink 203 is configured to receive a DC-coupled, Manchester II encoded sideband signal having an $I^2C$ communication protocol and including a clock signal and a data signal transmitted through the two lines of the sideband channel.

The type 2 dual-mode source 301 includes a connector interface 330 that can have the same physical footprint as the interface 230 such as used in a type 1 device described in FIG. 2. Also, the sink side second interface 333 is configured as the sink side interface 233. Also, the interface 332 can be configured as interface 232. Accordingly, these interfaces can enable connection with either the type 1 source 201 (as previously described) or a type 2 source 301. This connector interface commonality provides excellent backward compatibility with legacy source devices (such as 201). It is also pointed out that these are merely illustrative embodiments with the variety and configuration of interfaces being open to many possible configurations and thus, this illustration is not intended to be limited to any specific implementations illustrated in this patent.

In addition to the type 2 source 301, the multimedia network described in FIG. 3(a) includes a link 302 having an improved (type 2) adaptor 304 configured to enable data transmission using both legacy (type 1) dual-mode source devices and type 2 dual-mode source devices of a type described as follows. The adaptor 304 described here can support both newer devices and legacy devices and importantly can support data transmission through a four lane main link and a two line sideband channel.

The type 2 source device 301 is now further described. The type 2 source 301 includes a processor 315 for operating upon and processing multimedia content and associated data. The processor 315 can use an active protocol convertor to configure the data in one of a first data format (which is essentially the same as the first format supported by the type 1 source 201) or another alternative format data transmission configuration. Here, as the alternative format data transmission configuration produced this type 2 source 301 is different from that of a type 1 source 201 it is defined as a third mode signal (318, 319). When transmitting a first format signal, the processor 315 configures the multimedia content into a first format main link signal 316 and an associated first format sideband signal 317 these are essentially the same as the first format signal described above. For example, the first format main link signal 316 is transmitted over the four channel main link 310 as a packetized, AC-coupled, 8B/10B encoded signal with embedded clock information obviating the need for a clock line. An accompanying first format sideband signal 317 comprises a packetized, AC-coupled, Manchester encoded signal with embedded clock information transmitted using the pair sideband lines of sideband channel 320. A bi-directional half-duplex arrangement is suitable for use as such sideband channel 320.

Alternatively, the processor 315 can configure the signal for delivery to an adaptor and then a second format sink device (as shown here, sink 203). In this alternate configuration the processor provides a third mode signal comprising a third mode main link signal 318 and an associated third mode sideband signal 319. However, this alternative (third mode) communication is markedly different for type 2 source devices.

The third mode signal comprises: (a) a third mode main link signal 318 and (b) a third mode side band signal 319. The third mode main link signal 318 is configured in an "intermediate" format just as the second mode main link signal 218 described above. Here, as above, "intermediate" means an adaptor is used to put the main link signal into a final form compatible with the second format sink 203. Here, a type 2 adaptor 304 is used to convert this second mode main link signal 318 into a second format compatible with sink device 203. Advantageously, this third mode main link signal 318 is much the same as the second mode main link signal 218 transmitted by a type 1 source (i.e., both comprise a digitized (digitized rasterized video signal), AC-coupled, TMDS encoded main link signal comprising up to three data lanes and an associated clock lane collectively suitable for transmission using the four main link lanes).

However, the third mode sideband signal 319 is substantially different from the second mode sideband signal (219). The third sideband signal 319 comprises a digitized, AC-coupled, Manchester II encoded signal having an $I^2C$ over AUX communication protocol and further having a clock line and data line. The $I^2C$ over AUX communication protocol is different from the standard $I^2C$ communication protocol used in the second mode sideband signal of the type 1 dual mode source 201 described above.

This $I^2C$ over AUX communication protocol is specified, for example, in section 2.7 of the "Proposed VESA DisplayPort Standard (Version 1, Revision 2 dated Dec. 23, 2009) (hereby incorporated by reference) which specifies, among other things $I^2C$ bus transaction mapping onto an AUX syntax. Also, aspects of a relevant process are discussed in U.S. Provisional Patent Application No. 61/177,973, filed on May 13, 2009, entitled "Dual Mode Sideband Protocol" by Kobayashi, U.S. Provisional Patent Application No. 61/177,978, filed on May 13, 2009, entitled "Sideband Messaging Method" by Kobayashi, U.S. patent application Ser. No. 12/765,760, filed on Apr. 10, 2010, entitled "System And Method For Packet Messaging And Synchronization" by Kobayashi, all incorporated by reference.

Figure 3B:
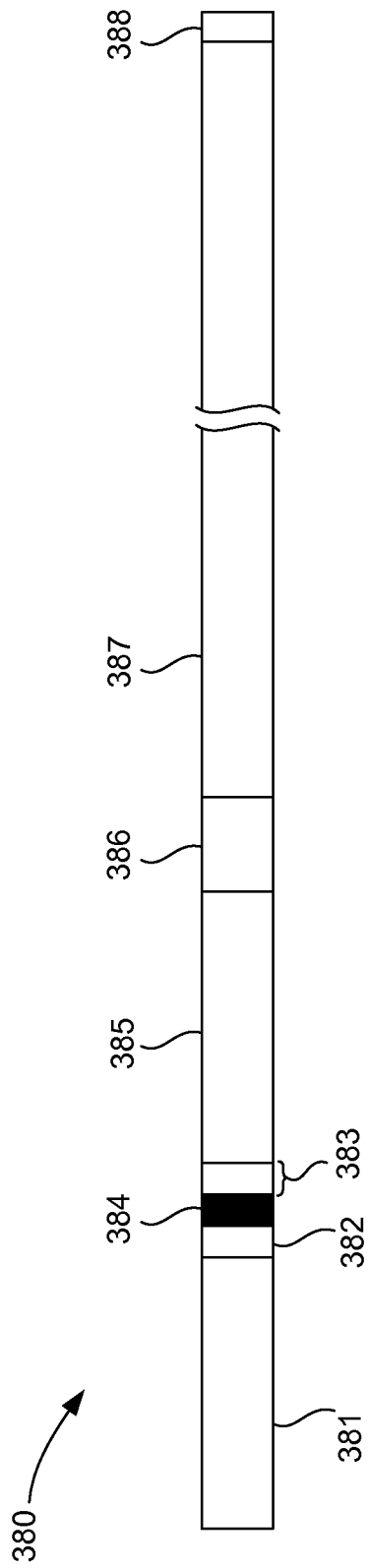
FIG. 3(b) diagrammatically illustrates an embodiment of a I2C over AUX message useful in aspects of messaging protocol in certain aspects of the present invention.

FIG. 3(b) briefly illustrates one schematic depiction of such an $I^2C$ over AUX message. In one example message 380 a data format is specified that is suitable for use with such an $I^2C$ over AUX communication. The message 280 begins with a 32 bit preamble portion suitable for synchronizing the receiver and sender of the sideband channel messages. A four bit start indicator 382 is followed by a four bit command 383. The first bit 384 of the command 383 is a protocol selection bit. For example, when the bit is set to a value of "0" the message is of a native type. When the bit 384 is a "1" it informs the received that the data within the message is in accordance with an $I^2C$ over AUX communication protocol. For an $I^2C$ over AUX message a 20 bit address field 285 is used to access the associated $I^2C$ device (the second format sink 203). An 8 bit length field 386 specifies a data length. And a data field 387 ends in a two bit stop message 388.

The advantage to this scheme is that both types of sideband signals (first format sideband signal and third mode sideband signal) can be encoded at the same place and transmitted over the same sideband lines without need for a switch in the type 2 dual-mode source 301. Accordingly, when the type 2 dual-mode source 301 is used with first format devices it does not suffer from the parasitic capacitance problem inherent in type 1 dual-mode sources 201 because there is no switch in the source 301.

As a result, the data transmission rates can remain very high (above the 1 Gb/s range) in the sideband link of the type 2 dual-mode source device 301. Thus, there will be no impediment to high sideband data transmission rates in type 2 systems that are using mode 1 operation (such as when the source is coupled with a first format sink device). Thus, such a type 2 source device 301 is capable of transmitting sideband signal at an extremely high data rate. Data rates of 500 Mb/s (mega bits per second) and higher are contemplated by this invention.

As indicated above, the first format signal (316, 317) first mode is the same as the first format (216, 217) described above with respect to the type 1 dual-mode source device 201. Accordingly, the first format signal of the type 2 source is the same as the first format signal of the legacy type 1 dual-mode source 201. Thus, the first format multimedia content is carried by the main link 310 as packetized, 3.3 V, AC-coupled signal encoded in an ANSI 8B/10B format with embedded timing information enabling self-clocking of the main link signal. The first mode sideband signal 317 is configured as packetized, AC-coupled, Manchester II encoded signal including embedded timing information, which is transmitted over the two lines of the sideband link 320.

It is pointed out that in one specific embodiment, the first format transmitted by the type 2 dual-mode source can comprise DisplayPort compatible main link and auxiliary (AUX) line signals. In one example, the connector interface 330 is arranged to enable connection of these signals with downstream DisplayPort® interface.

As with a type 1 source, a type 2 source requires an adaptor to fully configure the data for output to the second format sink device 203. In this instant case, the adaptor shall be referred to as a type 2 adaptor 304. Additionally, because the type 2 dual-mode source 301 formats data differently than a type 2 dual-mode source it is helpful for the type 2 adaptor 304 to have a way of distinguishing type 1 and type 2 dual-mode sources from each other. To that end a type 2 dual-mode source 301 includes a source format indicator 350 which can be used by the type 2 adaptor 304 (e.g., a source format detector 351) to distinguish the two types of dual-mode sources.

Embodiments of a type 2 source indicator 350 can include everything from a microprocessor including a wide range of information about the source 301 to a simple passive indicator providing minimal information to the adaptor 304. In one embodiment, the indicator 350 can simply be a resistive circuit placed on one or more lanes of a main link current path. Such a resistor will effectively pull down the voltage of a main link signal to a lower voltage level, low enough such that it can be readily detected by the type 2 adaptor 304. Importantly, the source indicator 350 enables the type 2 adaptor 304 to distinguish between type 1 and type 2 dual-source devices so that the adaptor 304 can operate properly with both types of source devices (201 or 301).

To briefly recap the type 2 dual-mode source 301 operations. A source mounted chip 360 includes a processor 315 that can identify the sink format. For example, by way of a sideband channel message transaction between the sink and the source. Upon determining sink format the processor 315 configures the data in one of a first mode and a third mode for transport either to a first format sink device or to a second format multimedia sink device 203 (through an appropriate adaptor). The source 301 includes a four lane 311-314 main link 310 configured to interface the chip 360 with an output interface 330. And also, a sideband channel 320 having a pair of sideband lines configured to interface the chip 360 with the interface 330. The source chip 360 determines the type of sink device attached with the source 301. For a first format sink a first format main and sideband signal are output from the chip 360 (source 301). For a second format sink 203 a third mode main and sideband signal are output from the chip 360 (source 301).

When the type 2 dual-mode source 301 is coupled with the second format sink device 203, the link 302 includes a type 2 adaptor 304 which can convert the third mode signal provided from source 301 into a second format signal compatible with the second format sink 203.

It should be pointed out that a type 2 adaptor 304 should be able to process both second mode signals provided by legacy (type 1) dual-mode sources 201 as well as third mode signals provided by type 2 dual mode sources 301 and convert both to a format compatible with a second format sink 203.

Type 2 Adaptor

An improved type of adaptor is described with further reference to FIG. 3(*a*). A used herein, this adaptor 304 is termed a type 2 adaptor. A type 2 adaptor 304 is intended to be compatible with both i) type 1 dual mode sources and ii) type 2 dual-mode sources. Thus, in general the function of the type 2 adaptor 304 is determine which type of source is transmitting the multimedia signal, receiving the signal, and then converting it to a format compatible with a downstream sink device.

In general, the type 2 adaptor 304 operative includes an array of systems and modules that enable a range of operations. These electronic systems are generally embodied in integrated circuit system(s). In one example, implementation the operational functionality is arranged in a system on a chip 355 configuration which can form a part of an adaptor 304. The inventors specifically point out that the systems, modules, circuitry, and other elements of the adaptor 304 can comprise a number of electrical and electronic elements arranged in any convenient arrangements such as can be appreciated by one of ordinary skill.

Accordingly, such a system 355 can comprise a system on a chip or a multi-chip system capable of performing some or all of the functions described. Such a chip system can comprise a microprocessor or application specific integrated circuits and can also include software embodied on tangible computer readable media and can include firmware in the operational systems of the adaptor 304.

With continued reference to FIG. 3(*a*), a link 302 between a type 2 dual-mode source device 301 and a second format sink device 203 can be established. In one embodiment (of which many alternatives are possible), the source 301 is coupled with the adaptor 304 using an interface 330 arranged to enable communication with the source 301 and the adaptor 304. In one approach, a plug and receptacle arrangement can be used. It should be pointed out that source 301 need not be directly coupled with the adaptor 304 but can include an intervening cable or other connection (to include a wireless connection). In this embodiment, the adaptor 304 is further with the sink device 203 using an ordinary cable 331. The adaptor 304 can be coupled with the cable 331 using an interface 332 (e.g., comprising a plug and receptacle arrangement). This cable 331 can then be coupled with the sink 203 using, for example, a similarly configured interface 333. The specification contemplates many different arrangements of the interfaces, adaptor, and cables that are not intended to be limited to the specific arrangement depicted here. For example, the cable 331 can include several cables or be moved to the other end of the adaptor comprising an interconnection between the source 301 and the adaptor 304 and so on.

Importantly, although FIG. 3(a) depicts a connection comprising a type 2 dual-mode source 301, a type 2 adaptor 304, and a second format sink device 203, the descriptions here can also apply to a connection between a type 1 dual-mode source 201, a type 2 adaptor 304, and a second format sink device 203. In fact, it is this interchangeability of sources (201, 301) that provide a significant contribution to the utility of the adaptor 304.

Referring again to the adaptor 304, the system 355 can comprise a main link processing module that includes main link level shifting circuitry 341. Further elements of the system 355 include sideband signal processing circuitry 370 that can include a second sideband signal processing module 371 and a third sideband signal processing module 372 as well as switch circuitry 373 enabling alternate selection of either 371 or 372 (depending on the type of sideband signal received). The system 355 can also include a power source 343 and a dual mode source format detector 351. The system 355 can also comprise additional and alternative systems, lines, connectors, chips, chip systems, and circuitry.

In operation, when the adaptor 304 is linked with the source device 201 or 301 (either directly or through a cable connected with the devices) a source format detector 351 identifies whether the source is a type 1 or type 2 dual-mode source (201, 301). Many, different approaches to source type discrimination can be employed. In this described embodiment, the adaptor source format detector 351 and the source format indicator 350 are used to determine whether the source is a type 1 or type 2 dual-mode source. As is readily appreciated by one of ordinary skill many modes of source discrimination can be used. One particularly useful approach is to format the type 2 source with a source format indicator 350 that simply comprises a resistor arranged on one or more of the main link data lanes. For example, if 100 kΩ resistive element is placed in a main link data lane (e.g., 311) it will draw down the main link voltage a significant amount. The source format detector 351 of the adaptor can comprise a voltage level detector. The detector 351 is capable detecting a lower voltage across the main link of a type 2 source 301 and distinguishing it from a higher voltage received from a legacy type 1 source 201. This is a particularly attractive approach because it does not require any change in the legacy (type 1) dual-mode sources 201. Also, it is relatively inexpensive, easy to implement, and does not impose difficulties on the circuitry of the adaptor 304. Thus, the source format detector 351 can, for example, use a comparator circuit (in the detector 351) to detect a voltage pull down caused by a resistive circuit 350 in the type 2 source. Additionally, because the main link signal of is subject to level shifting (e.g., 341) that "pulls up" the voltage to generate a DC-coupled signal the reduced voltage of the main link signal of a type 1 source does not pose a problem.

Accordingly, once the source type is identified, the type 2 adaptor 304 operates to receive and process the multimedia content in accord with the appropriate source format. For example, where the detector 351 detects a type 1 source 201 the adaptor 304 processes the signal accordingly. Alternatively, where the detector 351 detects a type 2 source 301 the adaptor 304 processes the signal in a different manner.

Type 2 Adaptor Main Link Signal Processing

Referring still to FIG. 3(a), as with a type 1 adaptor, the type 2 adaptor 304 includes level shifting circuitry 341 configured to convert an AC-coupled main link signal 318 to a DC-coupled signal. Also, the adaptor 304 can include sideband signal processing circuitry 370 that is alternatively configurable to process sideband signals received from either of type 1 of type 2 sources as will be described below.

The type 2 adaptor 304 processes the main link signal (e.g., 218 or 318) received from either a type 1 or type 2 dual-mode source in the same manner. When received from a type 1 source 201 the main link signal 218 comprises an intermediate format previously described as the second mode main link signal 218. In like manner when received from a type 2 source the main link signal 318 comprises an intermediate format third mode main link signal 318. As discussed previously, both second mode 218 and third mode 318 main link signals have the same configuration. Accordingly, when received, the main link signal (218 or 318) is received through the main link 344 of an adaptor 304 over three data lanes and a clock lane configured as digitized, AC-coupled, TMDS encoded, signal with associated the clock line. However, as before main link signals 218, 318 are not fully compatible with the second format of the sink device 203. Since the second format sink device 203 is configured to receive DC-coupled signal the AC-coupled main link signals 318 (or 218) must be "pulled up" to generate a DC-coupled main link signal 338 compatible with the sink 203. Typically, this is accomplished by the level-shifting circuit 341 of the adaptor 304. In one example, a 3.3V AC-coupled main link signal (218, 318) can be drawn up to a 5V DC-coupled signal. Thus, the output main link signal 338 comprises an AC-coupled, TMDS encoded, main link signal transmitted as 1-3 data signals over 1-3 data lines and a clock signal over the fourth main link line.

In one implementation, power for the level shifter 341 is provided by power source 343. This power source 343 can be used to power various adaptor functions. In one embodiment, the power system 343 can be connected with a source device 301 to obtain power. For example, in a common approach, the adaptor power source 343 obtains power from a source 301 power pin that is connected to a pin on the adaptor 304. In alternative embodiments, the power can be obtained from the sink device or other networked systems or even a local power source such as a battery in the adaptor. The power can be used by such adaptor systems as is needed. However, here power source 343 provides power to the level shifting circuitry 341 to pull up an AC-coupled main link signal to form the appropriate DC-coupled signal To continue, this DC-coupled signal 338 can be output through the four lanes of the adaptor main link 342 as three data lanes and the associated clock line. This final format main link signal 338 is now compatible with a second format sink device 203. This pulled up DC-coupled main link signal 338 will be received at the downstream device 203 for display or other processing.

Type 2 Adaptor Sideband Processing

One significant distinction between type 1 and type 2 adaptors is the way sideband signals are processed. As described above, a type 1 source sideband signal 219 comprises an AC-coupled, Manchester II encoded signal in accordance with an $I^2C$ protocol having a data and clock signal as transmitted through the two sideband channels. Such is referred to herein as a second mode sideband signal. Also, as described above, a type 2 source sideband signal 319 comprises an AC-coupled, Manchester II encoded signal in accordance with an $I^2C$ over AUX, with embedded clock signal as transmitted through the two sideband channels. Such is referred to herein as a third mode sideband signal. These formats are handled by the adaptor differently to produce an output second format sideband signal 339 comprising a DC-coupled, Manchester II encoded signal in accordance with an $I^2C$ protocol having comprising a data line (e.g., a DDC_DAT signal) and an associated clock line (e.g., a DDC_CLK signal) as transmitted through the two sideband channels. Such signal is in accord with a Display Data Channel protocol as specified by the Video Electronics Standards Association (VESA). It is pointed out that sideband output of type 1 adaptor 204 (which outputs output second format sideband signal 239) is the same. Both are intended to be compatible with a second format sink 203.

Accordingly, when a type 2 source 301 is coupled with a type 2 adaptor 304 the detector 351 identifies the source as a type 2 dual-mode source 301. As before, the main link signal 318 is received over four main link lanes of an adaptor main link 344 (i.e., in three data lanes and a clock lane). As previously explained the adaptor 304 uses the level-shifting circuit 341 to pull up the main link signal 318 generating the DC-coupled main link signal 338 which is output through the four lanes 342 of the adaptor main link as 1-3 data lines and the associated clock line. Additionally, the adaptor 304 receives a third mode sideband signal 319 (from the type 2 source) through the sideband channel 329. Accordingly the adaptor 304 must convert this signal 319 into a digitized, DC-coupled, I²C compatible signal comprising a data line and an associated clock line as a DDC signal so that it may be input into the second format sink device 203.

In this embodiment, this means that switch circuitry 373 selects an appropriate signal transmission path for the sideband signals. Here, this means the switch 373 directs the sideband signal 319 to convertor circuitry 372. This convertor 372 receives the packetized, AC-coupled, Manchester II encoded sideband signal, configured in an I²C over AUX protocol, with embedded timing information and converts it into a DC-coupled, Manchester II encoded sideband signal, configured in an I²C format, to include a clock signal and an associated data signal format appropriate for input into the second format source 203. In this case, that means that the convertor 372 includes circuitry capable of converting the AUX over I²C signal to a I²C protocol and extracting the embedded timing information to generate a data signal and a clock signal. Also, the signal is level shifted from an AC-coupled signal to a DC-coupled signal. For example, the signal 319 is "pulled up" from a 3.3V AC-coupled signal to generate a 5V DC-coupled signal. Such sideband signal can be output from the adaptor 304 as second format sideband signal 339 suitable for receipt by the sink 203.

Alternatively, when a type 1 source is coupled with a type 2 adaptor 304 (not shown here) the detector 351 identifies the source as a type 1 dual-mode source 201. In such circumstance, the adaptor receives a second mode sideband signal 219 (from said type I source). through the sideband channel 329 the adaptor 304 treats the sideband signal as a second mode sideband signal 219. Accordingly, the adaptor 304 selects 373 the second sideband signal processing module 371 which is configured to level shift the second mode sideband signal (e.g., 219) to generate a digitized, DC-coupled, I²C compatible signal comprising a data line (e.g., a DDC_DAT signal) and an associated clock line (e.g., a DDC_CLK signal). Thus, the second sideband signal processing module 371 configures the sideband signal 219 into the intended final format sideband signal 339 to be received by the sink 203. It is pointed out that the in some embodiments the main link level shifting circuitry 341 can be used to perform the level shifting of the second sideband signal processing module 371. Also, in some embodiments the circuitry of 371 can be integrated into the circuitry or 341 or replaced by the circuitry of 341.

In other words, the format detector 351 identifies the source as a type 1 source (e.g., 201) or a type 2 source (e.g., 301). Then a received signal (main link and associated sideband signal is processed. The main link is converted into a second format main link format. And the received sideband signal is input into the required sideband signal processing module 371, 372 which translates the sideband signal into the appropriate second format sideband format (e.g., a DDC format).

Figure 4:
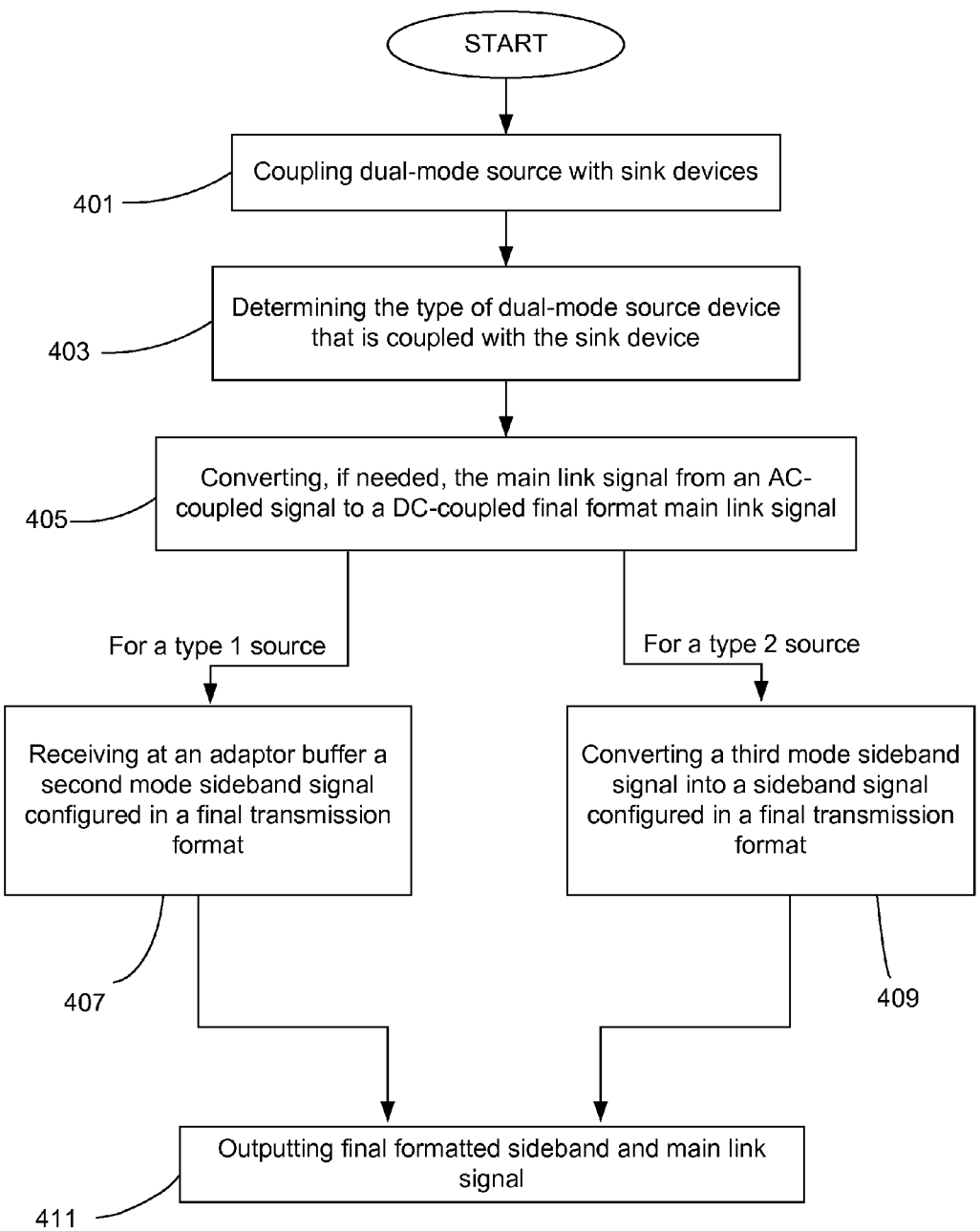
FIG. 4 is a flow diagram illustrating one approach for achieving interconnectivity between dual-mode source devices and sinks have different formats.

FIG. 4 is a flow diagram that describes one example method implementation of enabling the operation of a type 2 adaptor. In particular, when the type 2 adaptor forms a part of a network that can include a type 1 or a type 2 dual-mode source. To begin, a dual mode multimedia source device (201, 301) is coupled between a dual mode source device (generally having a primary first format) and a second format sink device (such that the second and third formats are different). In particular, the adaptor is a type 2 adaptor 304 introduced into a link 302 between such devices such that the data formats of the source and sink devices are different.

To begin, the source and sink are coupled using a type 2 adaptor 304 arranged between the source and sink (Step 401). Such source and sink devices can be of a type described herein. They source can be a type 1 dual mode source device (e.g., 201) or a type 2 dual mode source device (e.g., 301). In one non-limiting example, the source device can be a dual-mode source device with a DisplayPort® connector interface and the sink device can be configured to support DVI/HDMI multimedia content and includes a DVI/HDMI compatible connector. The arrangement enabling the interconnection of a dual-mode DisplayPort® compatible source device and a DVI/HDMI multimedia source device.

The adaptor 304 determines the type of dual-mode source device that is coupled with the source end of the adaptor (Step 403). As indicated above, the dual-mode source can be a type 1 (legacy) source or a type 2 source such as described above. A method of determining whether the source is a type 1 or 2 dual-mode source has been disclosed above. For example, the detection of voltage level across a main link lane(s) can be used to identify a source type. Other methods can be used as well, with the invention not limited to any specific method of source type identification.

After source format determination signal processing of the source signal is conducted to enable the source side signal to be compatible with the sink device. In particular, it is conducted to enable adaptor compatibility with both type 1 and 2 dual-mode source devices. Once the source type is determined processing of the source signals can be completed.

The main link signal is converted from an AC-coupled main link format to a DC-coupled main link format (Step 405). Typically, this is accomplished by using a level-shifter in the adaptor device arranged between the source and sink devices. Thus, the adaptor receives from the dual-mode source a main link signal (a digitized, AC-coupled, TMDS encoded signal including a clock line and data lines) over four data lanes (in this case operating as three data lines and a clock line). The type 2 adaptor, upon receiving the main link signals, performs level shifting to pull up the main link signal to level sufficient to generate a DC-coupled signal. Thereby generating an output main link signal comprising a digitized, DC-coupled, TMDS encoded signal including a clock line and data lines (suitable for transport over four data lanes (three data lines and a clock line)) suitable for receipt by the second format sink device.

Additional operations are performed on the sideband channel by the type 2 adaptor. The operations will be different depending on the type of dual-mode multimedia source used to transmit the sideband signal (e.g., Steps 407 or 409). Where the adaptor determines the type of source (Step 403) is a type 1 source, the adaptor will receive a second mode sideband signal from the type 1 source.

Accordingly, when coupled with a type 1 dual mode source, the type 2 adaptor receives the second mode sideband signal into the second sideband signal processing module 371 of the adaptor 304 (Step 407). As explained above, a second mode sideband signal comprises a digitized, AC-coupled, $I^2C$ compatible sideband signal carried over the two sideband lines as a data signal and an associated sideband clock signal. This sideband signal is in an nearly final format suitable for transmission to a second format sink device 203. This signal is received at the second sideband signal processing module 371 of the adaptor and upon processing can be output to the second format source device. Thus, the adaptor outputs a digitized, DC-coupled, $I^2C$ compatible sideband signal carried over the two sideband lines as data clock signal which is compatible with the second format source device.

Alternatively, where it is determined (Step 403) that the source is a type 2 dual-mode source, a different set of operations are performed on the sideband channel by the adaptor 304. In such case, the adaptor 304 receives a third mode sideband signal from a type 2 source. This third mode sideband signal is received into a third sideband signal processing module 372 (or convertor) of the adaptor 304 and converted from a third mode sideband signal into a side band signal (Step 409) suitable for processing by the second format sink device. As explained above, a third mode sideband signal comprises a packetized, AC-coupled, Manchester encoded signal having an $I^2C$ over AUX protocol having embedded timing information which is carried over the two sideband lines. For example, configured as a bi-directional half duplex auxiliary channel communication. The convertor 372 of the type 2 adaptor converts this third mode sideband signal into a sideband signal suitable for output into a second format sink device. For example, such output sideband signal comprises a digitized, DC-coupled, $I^2C$ compatible sideband signal also carried over the two sideband lines configured as a clock line and as a data line.

Accordingly, after all signals (main link and sideband) have been converted into the appropriate second format (i.e., a final format suitable for receiving by a second format sink device) they are output (Step 411) by the adaptor 304 to the second format multimedia sink device (e.g., 203).

Figure 5:
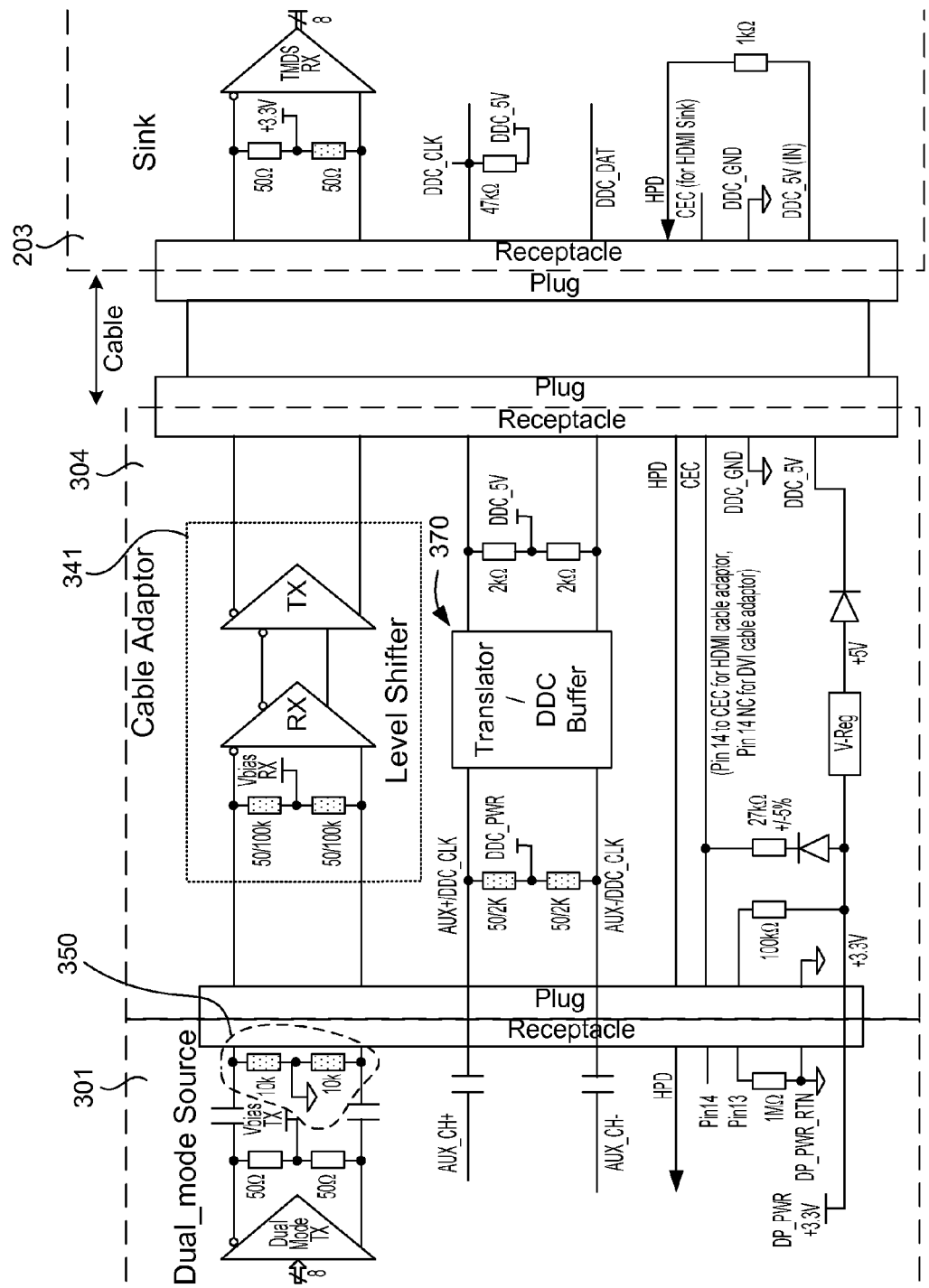
FIG. 5 is a diagrammatic block diagram showing various components and modules of a specific configuration of a network system including a type 2 dual-mode source and a type 2 adaptor connected with a second format sink device in accordance with one embodiment of the present invention.

FIG. 5 is diagrammatic view of one particular implementation of a type 2 source 301 and a type 2 adaptor 304 connected to a second format sink device 203. In particular, this embodiment can be used with a DisplayPort® compatible dual-mode source 301 (of type 2). Also, the sink device 203 can comprise a DVI/HDMI sink device. The main link transmitter of the source 301 is shown with an embodiment of a format indicator 350 on the main link of the sink. As shown here, a pair of 10 kΩ resistive elements are arranged in a main link pair to enable a weak pull down of the main link voltage enabling identification of the device 301 as a type 2 dual-mode source device 301.

The depicted type 2 adaptor is shown arranged in one link arrangement between the source 301 and sink 203. Also shown is one implementation of a level shifter 341 of the type 2 adaptor 304. The level shifter 341 arranged to enable main link voltage pull up to generate a DC-coupled main link signal. That can be output to a sink device 203 downstream. Also shown is an implementation of sideband signal processing module 370. Such can enable operation of a second sideband signal processing module 371 or the third sideband signal processing module 372 with either mode operable to produce sideband signal compatible with the second format sink device. Additionally, a number pin configurations are shown indicated.

In addition, embodiments of the present invention further relate to integrated circuits and chips (including system on a chip (SOC)) and/or chip sets. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An adaptor that enables data transmission from a dual-mode source device having a first primary data format to a sink device configured to receive a dissimilar second data format, the adaptor comprising:

a source format detector module that enables the adaptor to identify whether a dual-mode source device coupled with the adaptor provides multimedia data in a second mode or a third mode;

a main link level shifting module for converting a second mode main link signal and a third mode main link signal from an AC-coupled main link signal to a DC-coupled main link signal;

a second sideband signal processing module configured to process an AC-coupled second mode side band signal that includes a clock signal and a data signal by level shifting the second mode sideband signal to generate a DC-coupled sideband signal with the clock signal and data signal for output to the sink device; and a third sideband signal processing module configured to process an AC-coupled third mode sideband signal comprising a packetized data signal with embedded clock by converting the third mode sideband signal to a DC-coupled sideband signal with the clock signal and data signal for output to the sink device.

2. The adaptor of claim 1 wherein,
the main link signal is carried by four main link data pairs of a main link; and
the sideband signal is carried by two sideband lines of a sideband channel.

3. The adaptor of claim 2 wherein,
the second sideband signal comprises a digitized, AC-coupled, Manchester II encoded sideband signal using an $I^2C$ communication protocol having a data signal and a clock signal,
the second sideband signal processing module is configured to level shift the second sideband signal generating an output digitized, DC-coupled, Manchester II encoded sideband signal using an $I^2C$ communication protocol having a data signal and a clock signal.

4. The adaptor of claim 3 wherein,
the third sideband signal comprises a packetized, AC-coupled sideband signal using an $I^2C$ over AUX communication protocol having an embedded clock signal;
the third sideband signal processing module is configured to convert the third sideband signal into an output digitized, DC-coupled sideband signal using an $I^2C$ communication protocol having a data signal and a clock signal.

5. The adaptor of claim 4 wherein,
first sideband signal processing module is configured to use the main link level shifting module to perform level shifting operations on the second sideband signal.

6. The adaptor of claim 4 wherein,
second sideband signal processing module is configured to use the main link level shifting module to perform level shifting operations on the second sideband signal.

7. The adaptor of claim 4 wherein the source format detector module detects a voltage pull down in a main link of a dual-mode source coupled with the adaptor wherein said pull down identifies the source as supplying the third mode sideband signal.

8. The adaptor of claim 4 further including a power module configured to supply power to at least one of the main link level shifting module, the second sideband signal processing module, and the third sideband signal processing module wherein the power module is configured to draw power from the dual-mode source.

9. The adaptor of claim 4 wherein the adaptor outputs the digitized, DC-coupled, Manchester II encoded sideband signal using an $I^2C$ communication protocol having a data signal and a clock signal as final format sideband signal over the two sideband lines of a sideband channel as a DDC data signal and a DDC clock signal.

10. The adaptor of claim 4 wherein the modules of the adaptor are arranged on an integrated circuit as a system on a chip configuration.

11. An integrated circuit (IC) system that enables data transmission from a dual-mode source device having a first primary data format to a sink device configured to receive a dissimilar second data format, the IC system comprising:

source format detector circuitry that enables the IC system to identify whether a dual-mode source device coupled with the IC system supplies multimedia data in a second mode or a third mode;

main link level shifting circuitry for converting a second mode main link signal and a third mode main link signal from an AC-coupled main link signal to a DC-coupled main link signal;

second sideband signal processing circuitry configured to process an AC-coupled second mode side band signal that includes a clock signal and a data signal by level shifting the second mode sideband signal to generate a DC-coupled sideband signal with the clock signal and data signal for output to the sink device; and third sideband signal processing circuitry configured to process an AC-coupled third mode sideband signal comprising a packetized data signal with embedded clock by converting the third mode sideband signal to a DC-coupled sideband signal with the clock signal and data signal for output to the sink device.

12. The IC system of claim 11 wherein the circuitry can comprise a group of circuit elements comprising an electronic system arranged on a single chip.

13. The IC system of claim 11 wherein,
the main link signal is carried by four main link data pairs of a main link; and
the sideband signal is carried by two sideband lines of a sideband channel.

14. The IC system of claim 11 wherein,
the second sideband signal comprises a digitized, AC-coupled, Manchester II encoded sideband signal using an $I^2C$ protocol having a data signal and a clock signal,
the second sideband signal processing circuitry is configured to level shift the second sideband signal generating an output digitized, DC-coupled, Manchester II encoded sideband signal using an $I^2C$ communication protocol having a data signal and a clock signal.

15. The IC system of claim 14 wherein the second sideband signal processing circuitry is configured to level shift the second sideband signal to a 5V DC-coupled signal.

16. The IC system of claim 14 wherein,
the third sideband signal comprises a packetized, AC-coupled, Manchester II encoded sideband signal using an $I^2C$ over AUX protocol having an embedded clock signal;
the third sideband signal processing circuitry is configured to convert the third sideband signal into an output signal comprising a DC-coupled, Manchester II encoded sideband signal using an $I^2C$ communication protocol having a data signal and a clock signal.

17. The IC system of claim 16 wherein, the second sideband signal processing circuitry is configured to use the main link level shifting circuitry to perform level shifting operations on the second sideband signal.

18. The IC system of claim 16 wherein,
third sideband signal processing circuitry is configured to use the main link level shifting circuitry to perform level shifting operations on the third sideband signal.

19. The IC system of claim 16 wherein the source format detector circuitry detects a voltage pull down in a main link of a dual-mode source coupled with the IC system wherein said pull down identifies the source as supplying the third mode sideband signal.

20. The IC system of claim 16 further including power supply circuitry configured to supply power to at least one of the level shifting circuitry, the second sideband signal processing circuitry, and the third sideband signal processing circuitry wherein the power circuitry is configured to draw power from the dual-mode source.

21. The IC system of claim 16 wherein the IC system outputs the DC-coupled, Manchester encoded sideband signal using an I²C communication protocol having a data signal and a clock signal as final format sideband signal over the two sideband lines of a sideband channel as a DDC data signal and a DDC clock signal.

22. A computer chip system that enables dual-mode multimedia source operation enabling data transmission in two different multimedia data transmission modes, the chip comprising:
   i) a main data link having four data lanes comprising a pair of data lines each;
   ii) a sideband channel comprising two sideband lines;
   iii) a processor for formatting multimedia source data into two alternate data transport modes suitable for transport using the four main link lanes and the two sideband lines of the sideband channel, the data capable of being transported in one of a first or a second data transport mode wherein,
      a) in the first data transport mode
         a first main link signal is transmitted over four data lanes of a main link as a packetized, AC-coupled, ANSI 8B/10B encoded signal with embedded timing data enabling data transmission without a clock line, and
         a first sideband signal, associated with the first main link signal, is transmitted using the two sideband lines of the sideband channel to carry the first sideband signal comprising a packetized, AC-coupled, Manchester II encoded signal with embedded timing data enabling data transmission without a sideband clock line, and
      b) in the third data transport mode
         a third main link signal is transmitted over the four data lanes of the main link using three data lanes of the main link and using a fourth lane as an associated clock line, the third main link signal transmitted as a digitized, AC-coupled, TMDS encoded main link signal having clocking information transmitted over said fourth lane, and
         a third sideband signal, associated with the third main link, comprising an AC-coupled, Manchester II encoded signal transmitted over the two sideband lines as a sideband data signal with embedded timing data enabling data transmission without a sideband clock line using an I²C over AUX communication protocol.

23. The computer chip system of claim 22 incorporated into a dual-mode multi-media source device.

24. The computer chip system of claim 23 wherein the dual-mode multi-media source device includes an output interface connector configured to couple the four main link lanes and the two sideband data lines with a downstream device.

25. The computer chip system of claim 23, further including a source format indicator enabling an adaptor connected with the dual-mode multi-media source device to identify that the dual-mode multi-media source device supports the second data transport mode.

26. The computer chip system of claim 25, wherein the source format indicator comprises circuitry configured to pull down a voltage of at least one of the four main link lanes.

27. The computer chip of claim 26, wherein the source format indicator includes resistive circuitry arranged to draw down said voltage.

28. A method of coupling a first format dual-mode multimedia source device with a second format multimedia sink device using an adaptor arranged between the source and sink devices, the method comprising the operations of:
   receiving a source signal from the dual-mode source, the source signal configured as one of i) a second mode source signal having a main link signal and a second mode sideband signal or of ii) a third mode source signal having the main link signal and a third mode sideband signal;
   determining a source type for the dual-mode source;
   converting the received main link signal into a final format main link signal having a format that is different than the received main link signal and that is compatible with the second format multimedia sink device;
   for a first type source, receiving the second mode sideband signal and converting the second mode sideband signal into a final format sideband signal suitable for output as an output sideband signal compatible with the second format multimedia sink device;
   for a second type source, receiving the third mode sideband signal and converting the third mode sideband signal into the final format sideband signal suitable for output as the output sideband signal compatible with the second format multimedia sink device; and
   outputting the final format main link signal and the final format sideband signal.

29. The method of claim 28 wherein the method is performed by an adaptor device configured to enable communication between the source and sink devices, the method embodied on a tangible computer readable media such that the method operations are executed as computer executed instructions by said adaptor.

30. The method of claim 28 wherein the method is implemented by an integrated circuit configured to enable communication between the source and sink devices, the method embodied on a tangible computer readable media such that the method operations are executed as computer executed instructions.

31. The method of claim 30 wherein the computer executed instructions are implemented as firmware on the integrated circuit.

32. The method of claim 28 wherein the method is implemented by at least one integrated circuit.

33. The method of claim 28 wherein the received main link signal comprises an AC-coupled, TMDS encoded signal having a data component received over one, two, or three data channels of the main link and a clock signal received over a fourth channel of the main link; and
   wherein converting the received main link signal comprises level shifting the main link signal to generate a DC-coupled main link signal that is compatible with the second format multimedia sink device.

34. The method of claim 33 wherein
   the determining of the source type for the dual-mode source comprises determining that the source comprises the second type of source;
   the receiving a source signal from the dual-mode source comprises receiving the ii) the third mode source signal having the main link signal and with the third mode sideband signal comprising a packetized, AC-coupled, Manchester II encoded sideband signal using an I²C over AUX communication protocol having an embedded clock signal;

the converting of the side band signal comprises converting the third mode sideband signal to produce the a final format sideband signal comprising a DC-coupled, Manchester II encoded sideband signal using an $I^2C$ communication protocol having a data signal and a clock signal.

\* \* \* \* \*